United States Patent [19]
Gaisford et al.

[11] Patent Number: 6,023,586
[45] Date of Patent: Feb. 8, 2000

[54] INTEGRITY VERIFYING AND CORRECTING SOFTWARE

[75] Inventors: Calvin R. Gaisford, Provo; Matthew G. Brooks, Orem, both of Utah

[73] Assignee: Novell, inc., Provo, Utah

[21] Appl. No.: 09/021,691

[22] Filed: Feb. 10, 1998

[51] Int. Cl.[7] .................................................. G06F 15/173
[52] U.S. Cl. ...................... 395/712; 395/701; 395/200.5; 707/10; 707/103; 707/203
[58] Field of Search .............. 707/10, 100, 103, 707/203; 395/712, 701, 200.33, 200.49, 200.5

[56] References Cited

U.S. PATENT DOCUMENTS

| | | | |
|---|---|---|---|
| 5,157,782 | 10/1992 | Tuttle et al. | 395/575 |
| 5,218,605 | 6/1993 | Low et al. | 371/16.1 |
| 5,313,616 | 5/1994 | Cline et al. | 395/500 |
| 5,335,342 | 8/1994 | Pope et al. | 395/575 |
| 5,371,883 | 12/1994 | Gross et al. | 395/575 |
| 5,572,711 | 11/1996 | Hirsch et al. | 395/500 |
| 5,668,999 | 9/1997 | Gosling | 395/704 |
| 5,832,275 | 11/1998 | Olds | 395/712 |

*Primary Examiner*—Jean R. Homere
*Attorney, Agent, or Firm*—Madson & Metcalf

[57] ABSTRACT

An apparatus and method for self-healing of software may rely on a distribution object in a directory services of a network to provide data for controlling distribution of software and installation of files associated therewith. A software object may represent a software product, system, data structure, application, or the like, from a single byte, to a complex program. A directory services system is responsible for maintaining a data store of inter-related logical entities (directory services objects), including software objects and a distribution object containing all distribution information associated with certain distribution processes. Maintenance methods may be programmed into a directory services object or some other executable to verify the existence of files required for particular software. Verification may be completed in association with a launch request, by explicit request, or in an ongoing maintenance procedure. Maintenance may include executables and data to control, complete, and record integrity of distributed files as a distinct activity or as an ongoing, routine, periodic process of verification and appropriate re-installation of files, operating transparently to a user.

20 Claims, 13 Drawing Sheets

INTEGRITY VERIFYING AND CORRECTING SOFTWARE

BACKGROUND

1. The Field of the Invention

This invention relates to distribution of software over a network and, more particularly, to novel systems and methods for using directory services systems to effect software distribution as well as monitoring, verification, and repair (healing) of files required after the installation.

2. The Background Art

Software distribution has become an industry within an industry. Manufacturers of software products must distribute those products to users. Meanwhile, system managers are responsible for maintaining synchronization of software versions of licensed software, databases, internal software tools, and the like.

Software distribution has certain problems. Communication of the need for software must be made. Moreover, authorizations, timing, delivery, and the like, are issues that each user at a node in a network or a broader internetwork must accommodate. Likewise, system managers within organizations, departments, companies, sites at disparate locations, and the like must decide, authorize, distribute, and manage over organizations and wide physical terrain. The "sneaker net" is still in use, by which system managers actually distribute physical (e.g., on floppy disk, CD-ROM, etc.) copies of software. Moreover, many decisions are charted manually, authorization lists are authored and distributed, with feedback by any number of methods.

Thereafter, file integrity mut be verified and maintained. Automated verification would be very desirable. Automatic repair (e.g. distribution) of lost files would be valuable, and enabled by such a distribution method and apparatus.

Directory services have been developed, creating logical entities combined in data stores to represent organizations and entities that physically exist. One such popular directory services system is the Novell Directory Services (NDS) based on the X.500 network services protocol published by the CCIT and Open Systems Interconnection Consortium. In the example of client/server networks, a distributed directory may span several server nodes in a network. Information on a distributed directory may be created, read, modified, and shared by multiple nodes, such as client nodes or server nodes in networks of various sizes.

A distributed directory typically contains a collection of objects, each corresponding to an entity. For example, an object may represent a person, a particular computer, an organizational structure, a machine in a factory, an item of inventory, or the like. Associated attributes may include names, titles, identifiers, and the like having values recognizable by some software accessing such a distributed directory. Objects in a distributed directory may represent users, software objects or modules, computers, peripheral devices connectable to computers such as printers, data or software resources available to a user or a computer in a library, available files, programs, and the like.

In the directory services system, a structure of a distributed directory may be covered by a set of rules for adding and managing objects, and attributes of objects within a distributed directory. For example, rules may specify, such as through a dictionary, a standard set of data types, according to which objects may be created. Thus, an object may belong to a class having certain associated attributes. Attributes may be based on a set of standard attribute types, in turn based on certain standard attribute syntax.

An important part of directory services data structures (e.g. objects) is the ability to represent relationships among objects in a distributed directory. A schema typically controls these relationships, specifying a certain hierarchy among object classes. A group of object classes may exist, within which bounds, certain subordinate objects may be formed within a hierarchy. An object that contains another object is referred to as a container object. Container objects are building blocks of a distributed directory. An object incapable of containing another object may not have subordinate objects within hierarchy. Thus, such an object is a leaf object or a terminal object in a tree (hierarchy) of objects.

A distributed directory may be arranged in a hierarchical structure in the form of a tree, wherein branching points or terminal points (leaves) represent objects, and the other connecting branches represent relationships. The relationships are typically contained in the binding between different objects or different object types.

A distributed directory may be organized in partitions, each made up of some number of objects pertaining to a subtree or logical subtree. Any node (object) is considered a parent to any contained objects descending therefrom, as children or child objects. Similarly, partitions (subtrees) may be parent partitions to child partitions farther removed from some root. A partition may be identified in one simple scheme by the name of the node or object entry that forms the root of the subtree representing the partition.

In a distributed directory, various partitions may be stored at numerous locations throughout a network. Nevertheless, a particular server may have a unique set of partitions, and therefore a unique set of objects. Replicas may be able to be read-only, or have read/write accessibility. The operation of directory services systems is understood in the art.

Unfortunately, much of the great knowledge stored in a directory services system has not heretofore been available for ready use by a system manager for purposes of distributing software. Moreover, configuration faults may occur, leaving users missing required files. Nevertheless, the very issues that a system manager must deal with in communication, authorization, distribution, feedback, verification repair, and the like could conceivably be embodied in objects or attributes (and methods)of objects within a directory services system. An apparatus and method are needed to take advantage of the information available and easily managed in a network directory services system. This information may relieve the heavy physical and logistical burden on systems managers who are trying to manage and execute the distribution of software.

BRIEF SUMMARY AND OBJECTS OF THE INVENTION

In view of the foregoing, it is a primary object of the present invention to provide an apparatus for distributing and maintaining software over a network, using a directory services system associated with the network to provide controlling data and targeting for such distributions.

It is another object of the invention to provide distribution of a software object and its corresponding files from a source node, using distribution-controlling data provided from a directory services data store in the network.

It is an object of the invention to provide a method and apparatus for verifying.

It is an object of the invention to provide monitoring of an integrity of a distribution by a directory services system.

It is an object of the invention to provide detection, repair, and reinstallation of damaged and missing files, as needed.

It is an object of the invention to provide automated transparent verification and healing of software installations.

It is an object of the invention to provide the foregoing features for a distribution to multiple targets selected simultaneously from more than one level of a hierarchy of logical entities.

It is an object of the invention to provide a method for detecting and repairing (healing) distributed software over a network, using a directory services system of the network.

Consistent with the foregoing objects, and in accordance with the invention as embodied and broadly described herein, an apparatus and method are disclosed in one embodiment of the present invention as including a network interconnecting a source node storing a software object to a directory services node operably programmed to maintain a data store of logical entities interrelated to one another in a hierarchy. A workstation node in the network is programmed to receive from the directory services node certain distribution-controlling data for controlling distribution of the software object to nodes in the network, such as to the workstation node itself.

The distribution-controlling data may reside in a distribution object, which may be one of the logical entities. The distribution object, certain data therein, or both, may be recognizable by the workstation node, prompting the workstation node to make the distribution.

Data and executables may be stored in one or more memory devices accessible over the network. Thus, a data store, a software object, required controlling data and executables (e.g. attributes and methods) a directory services executable effective to provide directory services, a distribution executable to effect a distribution in accordance with a distribution object, and the like, may be stored for access in accordance with rights and relationships maintained by a directory services system.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 13, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the details illustrated in the schematic diagrams of FIGS. 1–13 may easily be made without departing from the essential characteristics of the invention. Thus, the following description is intended only by way of example, illustrating certain presently preferred embodiments consistent with the invention as claimed herein.

Figure 1:
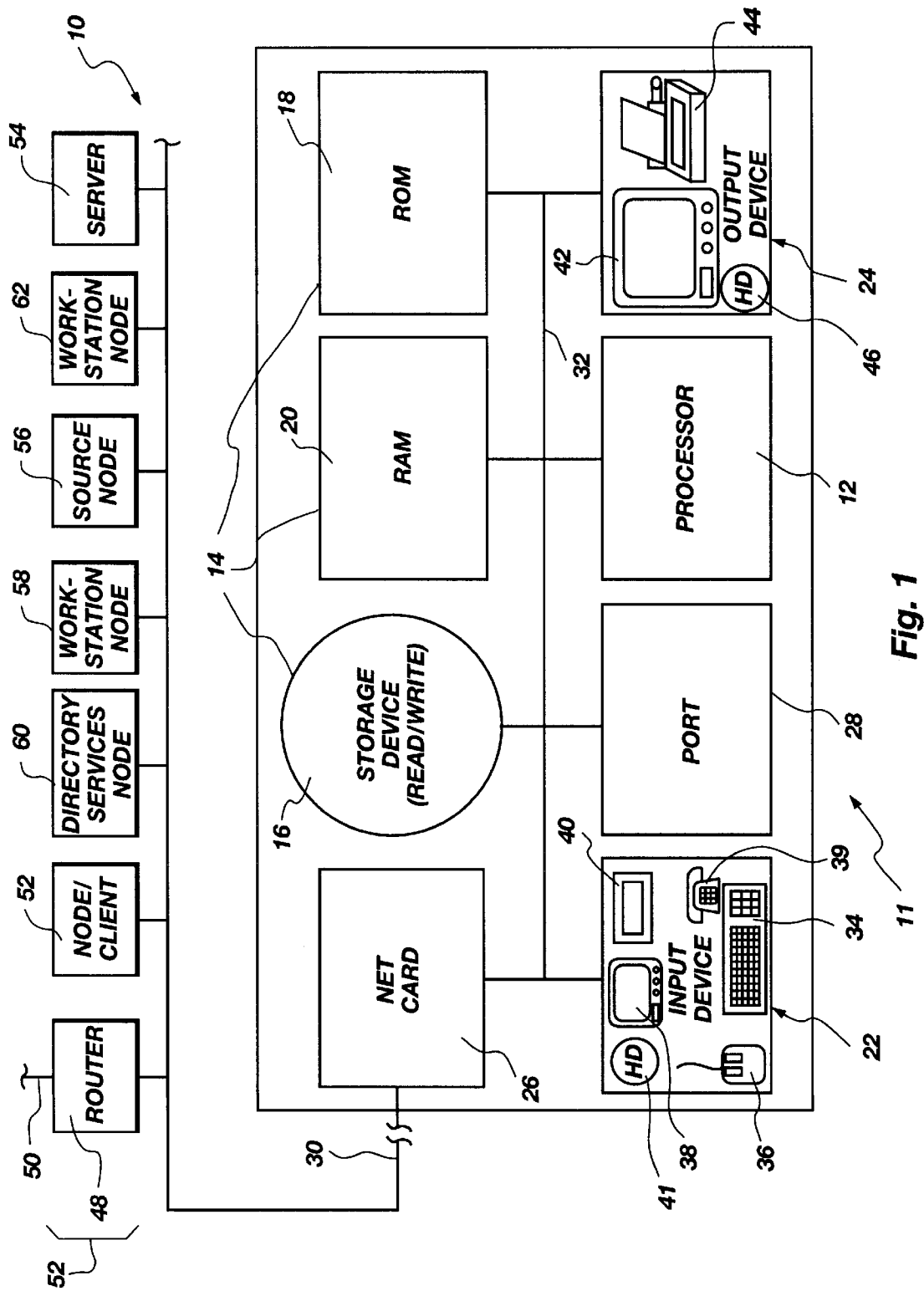
FIG. 1 is a schematic block diagram of an apparatus in accordance with the invention.

Referring to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

The source node 56 is so called because it stores a software object 100 (see FIG. 4) to be distributed to other nodes 52. The workstation node 58 is so designated in that it conducts a distribution of the software object 100 from the source node 56.

Software may include applications, executables, or any file, block, bytes, or bits of data that may be packeted or otherwise transferred between cooperating elements of a computer network.

In general, software may be embodied in an object 100. By a software object 100 is not meant necessarily a programming object. Rather any bits, bytes, files, applications, packets, blocks, or the like may be identified and isolated for distribution. Such an identifiable entity to be distributed may be thought of and referred to as a software object 100.

The directory services node 60 provides the directory services as known in the art. Accordingly, the directory services node 60 hosts the software and data structures required for providing directory services to the nodes 52 in the network 30 and may do so for other nodes 52 in other networks 50. The directory services node 60 contains a data store 78 (see FIG. 2) containing logical entities 82. Among the logical entities 82 is a distribution object 80 (see FIG. 3) that will provide the information required for the workstation node 58 to conduct a distribution of the software object 100 from the source node 56.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device for operational memory as well as a non-volatile storage device 16 such as a hard drive 16. Typically, an input device 22 and an output device 24 are provided for user interaction with the directory services node 60.

The term "application object" may refer to the same entity as the term "distribution object" herein.

In general, any number of workstation nodes 58, 62 may exist in a network 30, within some practical limit. A workstation node 58, 62 may conduct a distribution of a software object 100 to itself, or to some other node 52.

Figure 2:
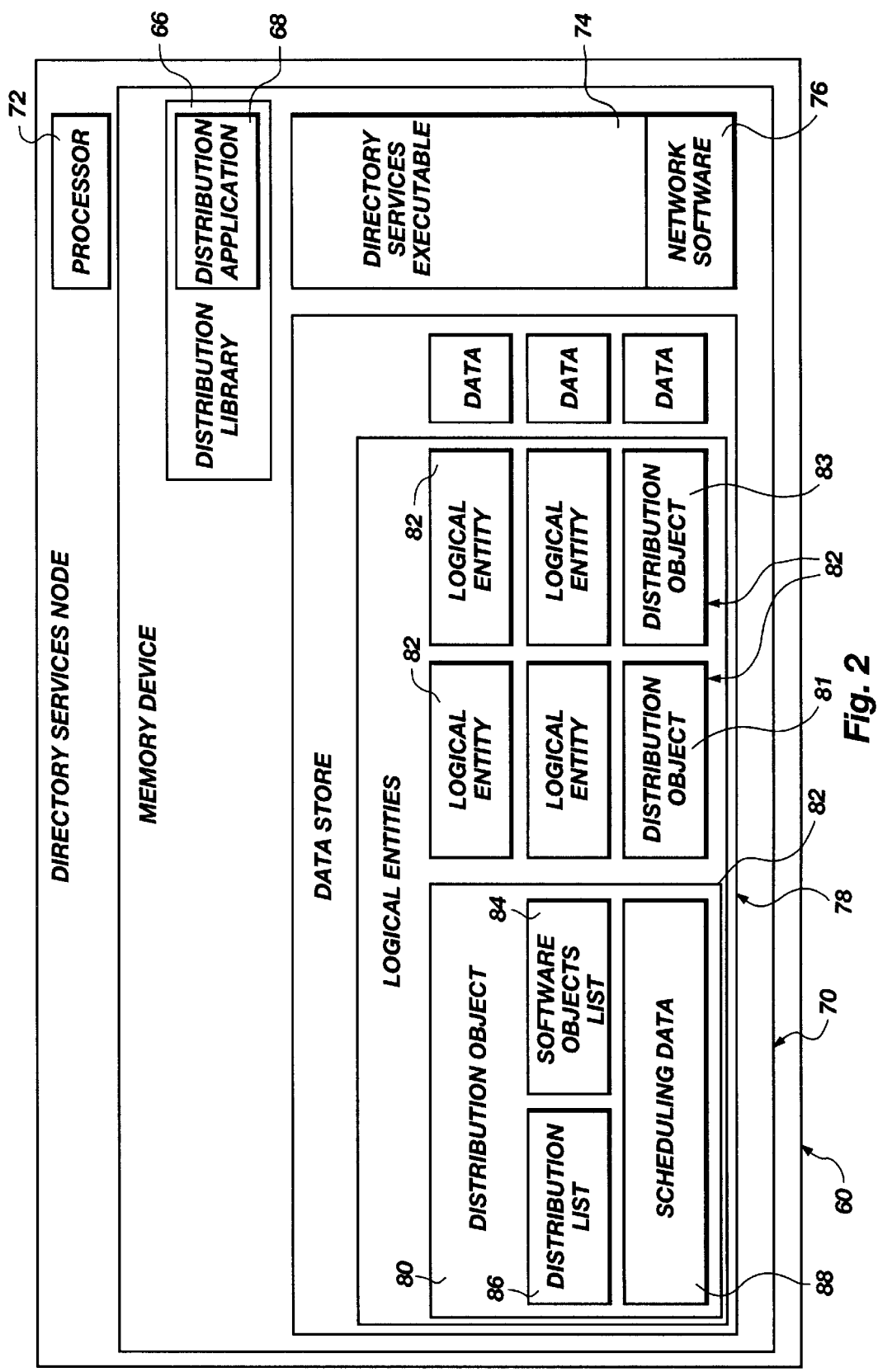
FIG. 2 is a schematic block diagram of a directory services node in the apparatus of FIG. 1.

Referring to FIG. 2, a directory services node 60 may include a memory device 70 or memory 70 operably connected to a processor 72 or CPU 72. The memory 70 may store data structures such as the data store 78 or the executables 74, 76.

The directory services executable 74 may include a single instruction or many instructions, but is typically a massive application executable on the processor 72 to provide directory services related to logical entities 82 in the data store 78. The directory services executable 74 may typically operate on top of network software 76. The network software 76 provides the networking capability to connect the directory services node 60 to the network 30. Thus, the directory services executable 74 may communicate to other nodes 52 over the network 30 by way of the network software 76 executed by the processor 72 as appropriate.

The data store 78 associated with a directory services node 60 contains interrelated logical entities 82. The logical entities 82 are typically related in a hierarchical relationship. For example, directory services trees commonly represent numerous logical entities, each corresponding to some real entity of significance to a user, interconnected by relationships or links.

Real entities may include organizational structures or groups, hardware devices in a network or an internetwork, individuals by name within an organization, organizational positions in an organizational structure, dealers in a distribution chain for commercial marketing, and the like. The logical entities 82 are related to one another, each bearing some correspondence relationship to some real entity, typically located elsewhere.

On the other hand, a logical entity 82 may correspond to a node 52, such as the directory services node 60 itself. Meanwhile, other logical entities 82 may correspond to various nodes 52 in the network 30.

The logical entities 82 may include a distribution object 80 as one of the logical entities 82. A distribution object 80 may include data structures representing information associated with one or more distributions to be effected by a node 52 in the network 30.

For example, a distribution object 80 may include a list 84 of software objects. The software objects list 84 may contain a listing of numerous software objects 100 to be distributed according to information contained in the distribution object 80.

In an alternative embodiment, distribution lists 86 may be contained within the distribution object 80. The distribution object 80 may identify or correspond to particular logical entities 82 to which (or to whose corresponding real entity) a software object 100 is to be distributed. In yet another alternative embodiment, a distribution object 80 may contain binding information to bind software objects 100 identified in a software objects list 84 to distribution lists 86 identifying logical entities 82 to which a particular, bound, software object 100 is to be distributed.

A distribution object 80 may also contain scheduling data 88. The scheduling data 88 may correspond to a distribution list 86, a software object list 84, or both. Scheduling data 88 may provide limitations on the timing to be observed in conducting a distribution of a software object 100 in accordance with a distribution object 80.

Figure 3:
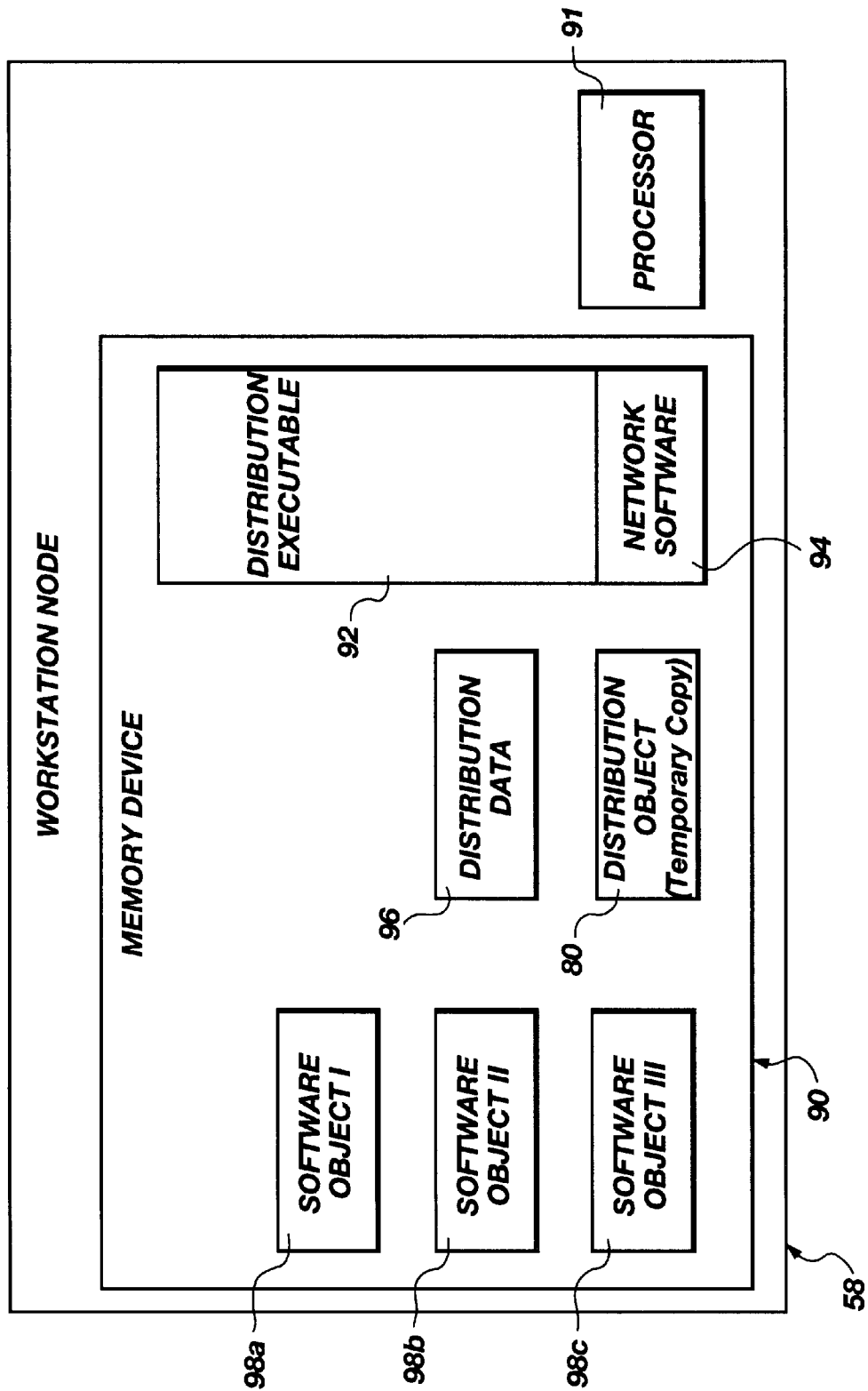
FIG. 3 is a schematic block diagram of a workstation node for effecting a software distribution in the apparatus of FIG. 1.

Referring to FIG. 3, a workstation node 58 may contain a memory device 90 or memory 90 for storing executables and data. For example, a distribution executable 92 may be stored to be executed by a processor 91. The distribution executable 92 may be programmed to distribute a software object 100 from a source node 56 to destinations corresponding to logical entities 82, in accordance with the distribution object 80.

The executables 74, 92 for interaction of the workstation node 58 and the directory services node 60 may run on top of client 94 and server software 76 that implements the network connections of all nodes 52. The type of network 30, and the client to server relationships, are not critical to the invention. that is, the directory services node 60 and the workstation node 58 may be any appropriate nodes 52 in a network 30 hosting the appropriate software 76, 94 required for communication with one another The workstation node 58 may store a copy 80 (see FIG. 3) of the distribution object 80 (see FIG. 2), but need not do so in all cases. In one currently preferred embodiment, a temporary copy 80 of a distribution object 80 may be stored in the memory device 90 for some time sufficient to extract or use distribution data 96 contained therein.

After completion of a distribution, a workstation node 58 may save or destroy the distribution data 96 obtained from the distribution object 80 to effect the distribution. A workstation node 58 may thereby transfer to itself various software objects 98, such as the software objects 98a, 98b, 98c. Any of the software objects 98 may be a copy or instantiation of the software object 100 or the software object 102 from the source node 56. Alternatively, the software objects 98 may originate elsewhere.

Figure 4:
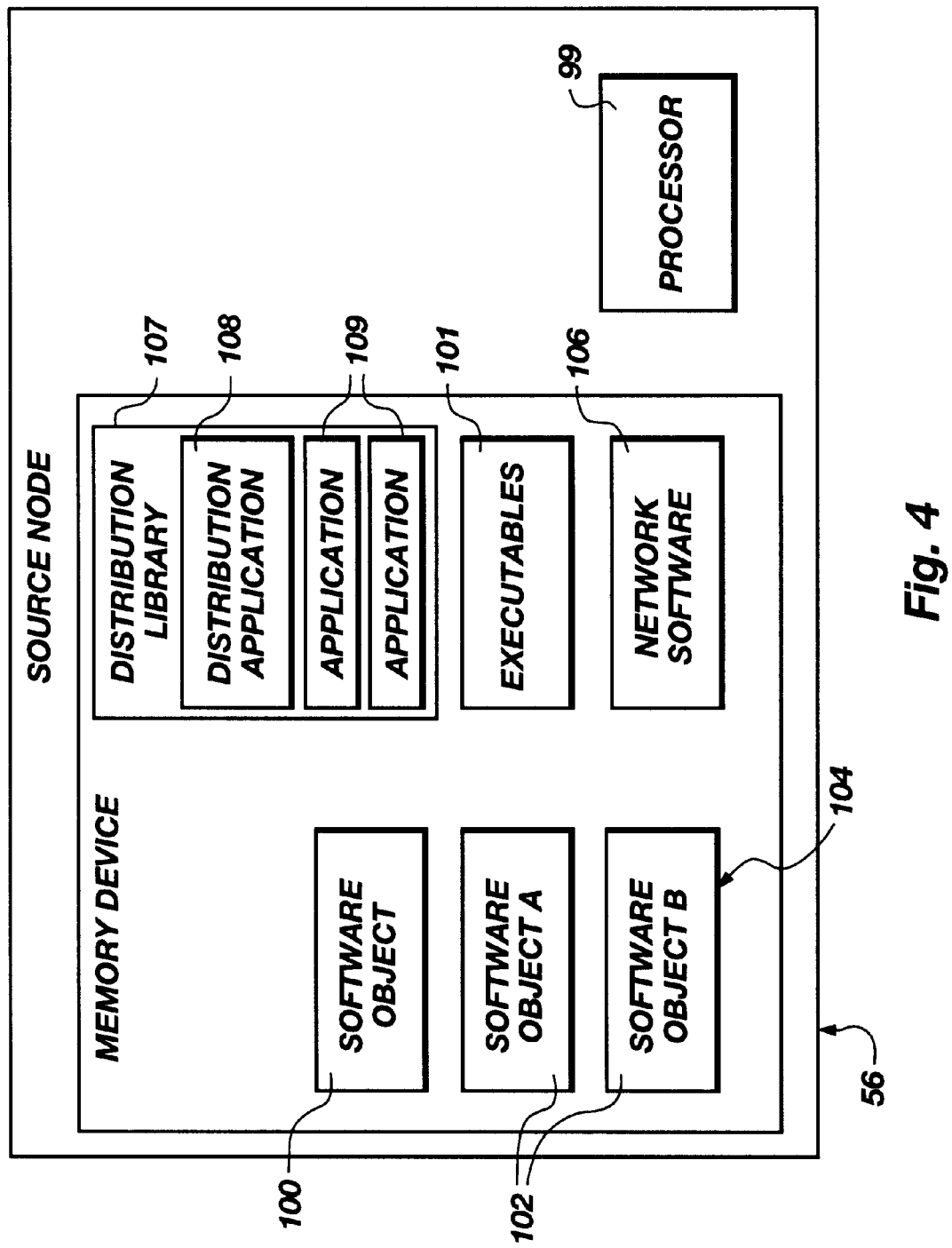
FIG. 4 is a schematic block diagram of a source node for providing a software object to be distributed in accordance with the invention in the apparatus of FIG. 1.

Referring to FIG. 4, a source node 56 may contain a processor 99 for executing executables 101 stored in the memory device 104. For example, network software 106 is one executable that will typically be executed by the processor 99 to maintain a connection between the source node 56 and the network 30.

In general, the significance of a source node 56 is that a software object 100 or multiple software objects 100, 102 are stored in the memory device 104 thereof. The software objects 100, 102 may be distributed by a workstation node 58 to other nodes 52, including the workstation node 58 in the network 30.

Figure 5:
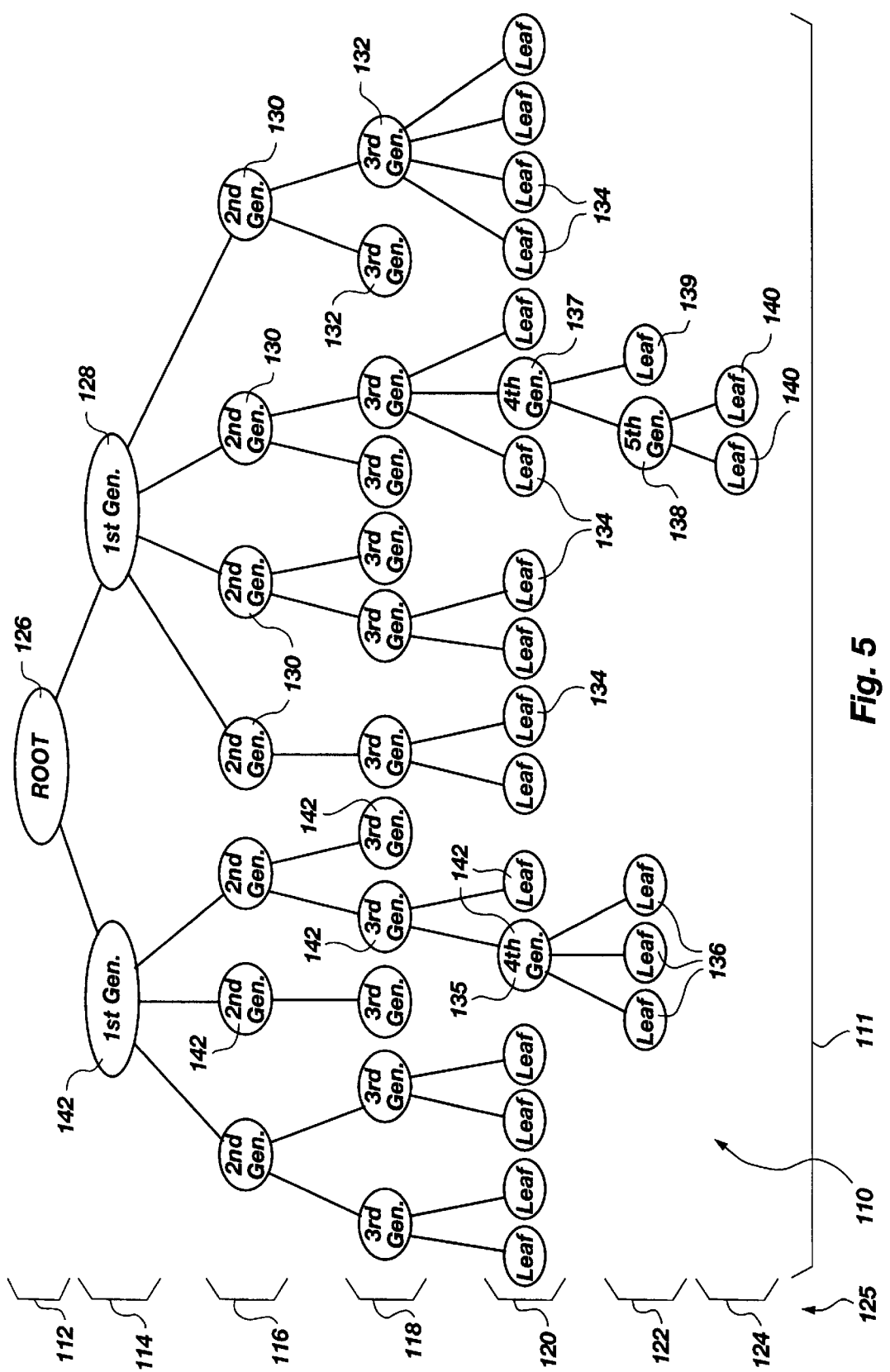
FIG. 5 is a schematic block diagram of a memory device, which may be made up of one or more of the memory devices of FIG. 1, to store the data structures for implementing the invention in the apparatus of FIG. 1.

Referring to FIG. 5, a tree representation of a hierarchy of 110 of nodes 111 or logical entities 111 is represented. The logical entities 111 may be the logical entities 82 of the data store 78 in the directory services node 60.

It is important to realize that logical entities 111 may be made up of data corresponding to a real or actual entity. For example, a logical entity 111 may be an entry, record, field, or the like in a database. Nevertheless, the logical entity 111 may correspond directly or indirectly to a computer, a database, another logical entity, an organization, a location, a person, a process, a machine, or the like. Thus, an activity (e.g. distribution) may occur with respect to an actual entity, corresponding to a logical entity 111.

In general, a hierarchy may be represented as a tree 110 having different levels 112, 114, 116, 118, 120, 122, 124. These levels 125, collectively or individually, may be characterized in terms of a root 126 with subsequent levels 114 corresponding to a first generation of children or branches from the root 126.

For example, the node 128 or logical entity 128 in the tree 110 is a first generation child of the root 126, or a first generation branch 128 of the root 126. Similarly, the nodes 130 in the level 116 correspond to second generation children with respect to the root 126.

The second generation nodes 130 are the first generation of children with respect to the node 128 and the second generation with respect to the root 126. Similarly, in the level 118, third generation children 132 or branches 132 descend from second generation children nodes 130.

At the level 120, various leaf nodes 134 exist. The leaf nodes have no further branches or children. Instead, the leaf nodes 134 terminate their respective branches of the tree 110.

By contrast, in the level 120 certain nodes 135 branch further to the leaf nodes 136 in the level 122. Meanwhile, in this example, certain nodes 137 branch to both fifth generation nodes 138 in level 122 and to a leaf node 139 in level 122. Moreover, the fifth generation node 138 in the level 122 branches further to the leaf nodes 140.

The various levels 125 may correspond to levels of hierarchy or relationship in a real environment. Thus, although the tree 110 represents logical entities 111 or nodes 111 arranged by levels 125, these logical entities 111 may actually represent real entities.

In a distribution context, rights, relationships, needs, functions, and the like corresponding to real entities, may be represented by each of the levels 125 and each of the nodes 111 in the tree 110 or hierarchy 110. Thus, one may speak of the nodes 111 as if they were their own corresponding real entities, although, in reality, it is understood that the nodes 111 are logical entities 111 corresponding to real entities or representing real entities.

Rights of distribution or need for distribution of a software object 100 may vary between the levels 125 and even among different nodes 111 within a single level 125. Accordingly, a distribution object 80 may contain information corresponding to distribution rights to be observed by a workstation node 58 in conducting a distribution of a software object 100 among the real entities corresponding to the logical entities 111 or between the level 125 in the hierarchy 110.

Figure 6:
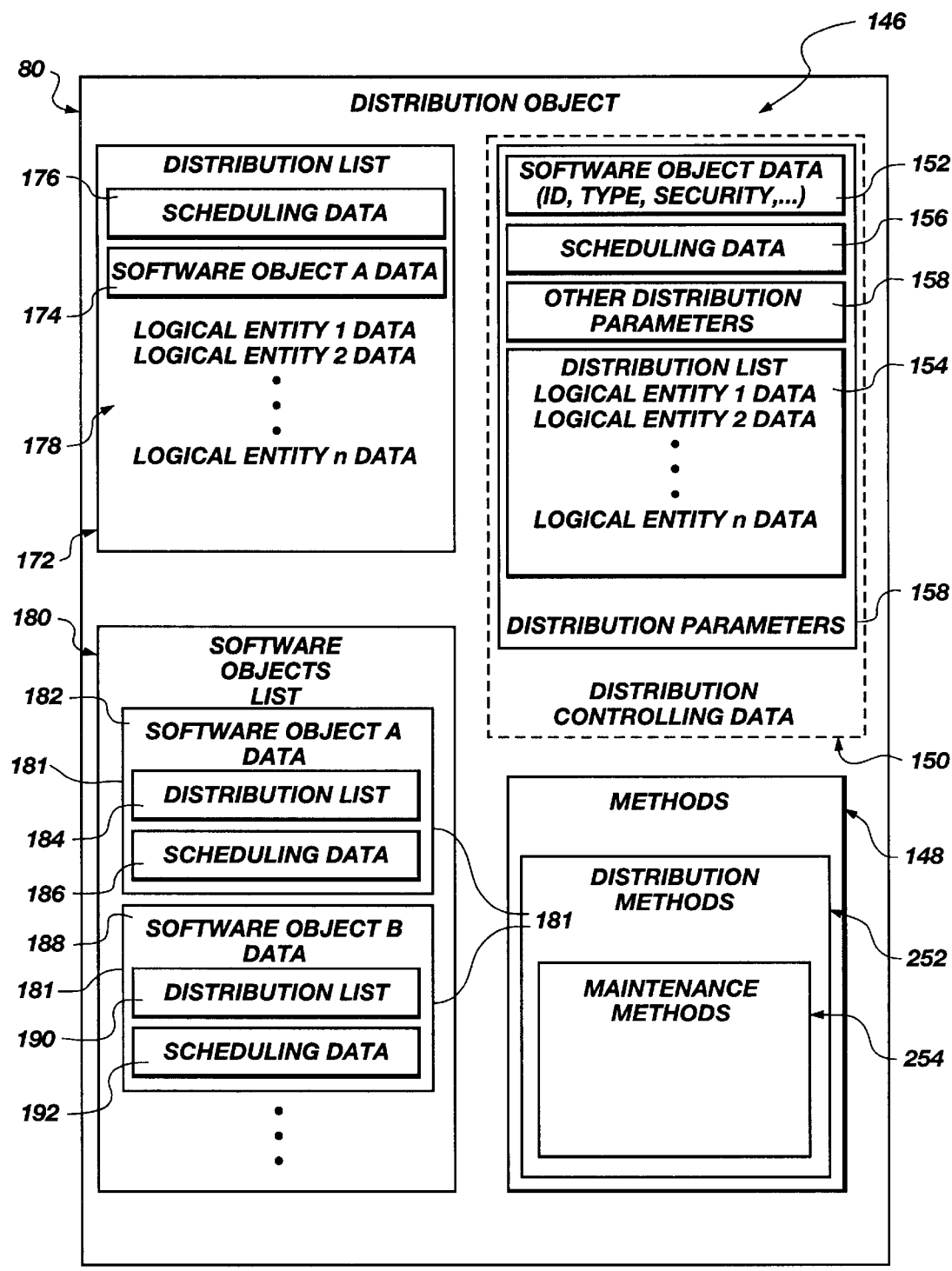
FIG. 6 is a schematic block diagram of data structures comprising a distribution object in accordance with the invention.

Referring to FIG. 6, a distribution object 80 may contain distribution-controlling data 150. The distribution-controlling data 150 may be embodied in individual objects 152, 154, 156, 158, or the distribution-controlling data 150 may be considered an object itself.

In one embodiment, distribution-controlling data object 150 may be a distribution list 172. The distribution list 172 may contain software object data 174 binding the distribution list 172 to a particular software object 100 to be distributed. Scheduling data 176 may be bound to the distribution list 172 or may be contained therein as a field, record, object, or the like.

Principal in the distribution list 172 is a list 178 or logical entity data 178. The list 178 contains data identifying and otherwise describing or characterizing various logical entities 82 to which the software object 100 corresponding to the software object data 174 is to be distributed.

One should keep in mind that strictly speaking, the software object 100 may be distributed to a real or actual entity corresponding to a logical entity 82. Nevertheless, whether or not the software object 100 is actually sent to the logical entity 82 or is sent to the real object corresponding to a logical entity 82, one may speak of either situation as a distribution to a logical entity 82 and be understood.

A logical entity 82 represents, schematically, a real entity for purposes of visualization. For example, relationships within an organization of people are intangible. Nevertheless, members of that organization exist, and may be represented on a chart, or may be represented by some data structure representing the people (entities) and their relationships.

Distribution-controlling data 150 may include software object data 152. Software object data 152 may, in turn, include identification of a particular software object 100 to be distributed; a type corresponding to either the software object 100 or the nature of a distribution being effected; security information, such as access lists, right-to-know data, or need-to-know data; and the like. Thus, the software object 100 may be characterized with the software object data 152.

Meanwhile, scheduling data 156 may contain information such as the date by which a distribution must start, may start, must not start, or the like. Similarly, scheduling data 156 may include end dates, after which no distributions may be made.

In one example, virus eradication software may be executed. Scheduling may be critical to assure that the virus is not permitted to survive in one part (original host) of a system while being eradicated in another, only to be transferred into that other part of the system when the one is being scanned to eradicate the virus.

Likewise, completely consuming network resources for a distribution may be unwise. Accordingly, in certain circumstances, a lengthy window over which a distribution may occur may be called out in the scheduling data 156.

The distribution list 154 may identify logical entities 82 that are to receive a copy of a software object 100 to be distributed. A workstation node 58, may review a distribution list 154 to determine whether or not that individual workstation node 58 is identified to receive a distribution of a software object 100.

When a workstation node 58 finds itself identified in a distribution list 154, the workstation node may load or download the appropriate distribution object 80 and proceed with the distribution in accordance therewith. Similarly, a workstation node 58 may find itself identified in other distribution parameters 158. For example, a workstation node 58 may find that it has been identified in other distribution parameters 158 as the distributing end node 52, to distribute over some distribution list 154 to other workstation nodes 62. Thus, distribution may occur in parallel. Thus, the work load is broadly distributed.

Distribution itself may occur by any mechanism known in the art. That is, distribution of a software object 100 may be as simple as copying the software object 100 to a particular node 52, such as the workstation node 58. The distribution-controlling data 150 may control a distribution by identifying information such as access rights, timing, and the like.

In an alternative embodiment of an apparatus and method in accordance with the invention, distribution-controlling data 150 may be embodied in a software objects list 180. The software objects list 180 may include data structures 181 containing software object data 182, 188. The software object data 182, 188, may include a distribution list 184, 190, corresponding to the particular software object 100 in question.

Similarly, the scheduling data 186, 192, may be found in a respective distribution list 184, 190 as well as, or instead of, in the software object 182, 188. Thus, a software objects list 180 may be associated with a simple distribution. Alternatively, a single distribution list 172 may be associated with a distribution. In either event, a respective distribution list 184 may be bound to a software object 182, or a distribution list 172 may be bound to a software object 174 (software object data 174 corresponding to the software object 100).

The distribution parameters 158 may include any available, necessary, helpful information, or the like up to and including the entire distribution-controlling data 150.

Figure 7:
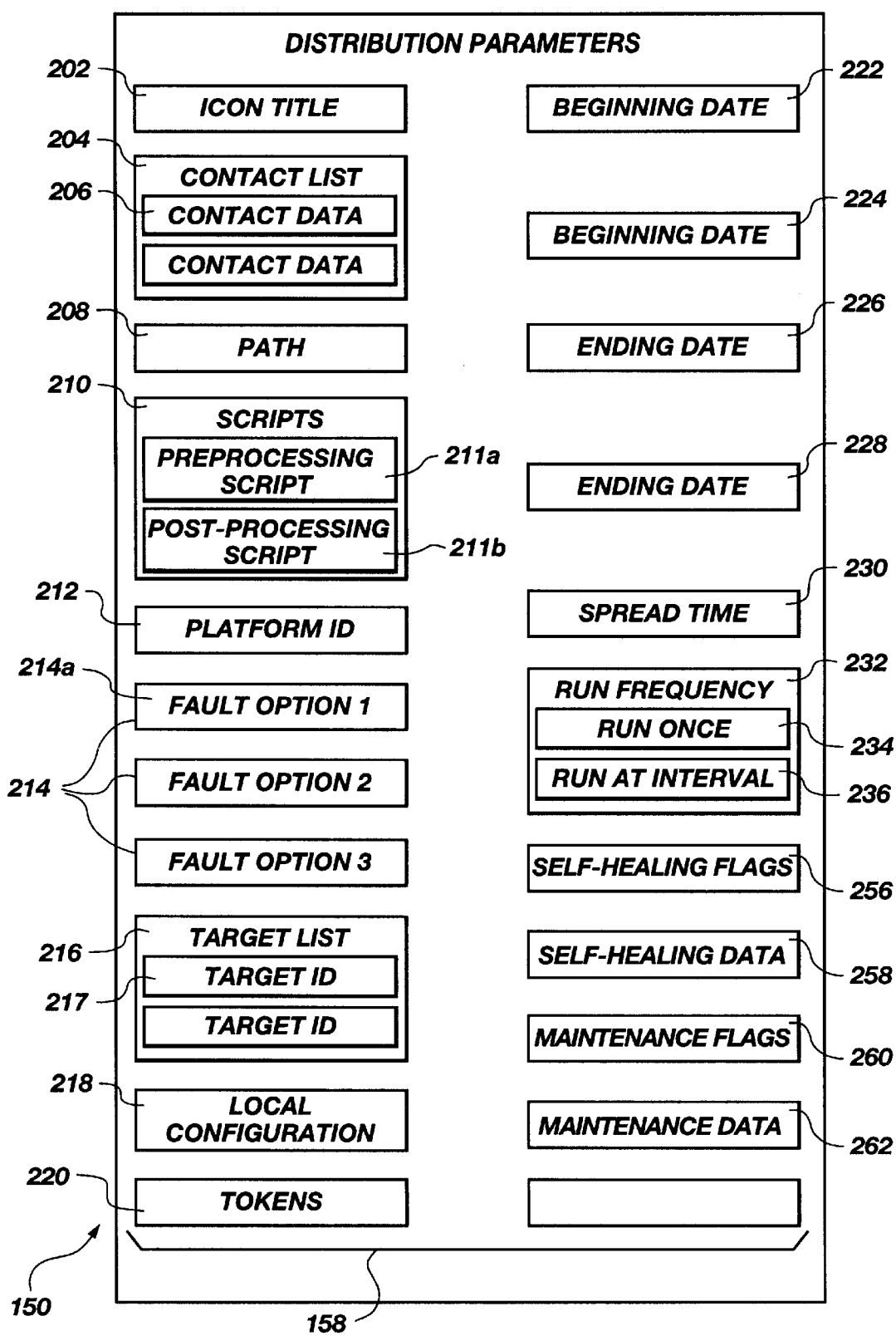
FIG. 7 is a schematic block diagram of distribution parameters that may be included in the distribution-controlling data of a distribution object of FIG. 2.

Referring to FIG. 7, several distribution parameters 158 may be included in the distribution-controlling data 150. For example, distribution parameter 158 may include a title 202, contact list 204, path 208, scripts 210, platform identifier 212, fault options 214, and target lists 216. Likewise, distribution parameters may include local configuration data 218, tokens 220, and the like.

Scheduling controls, such as the scheduling data 156 may include distribution parameters 158 such as a beginning date 222, beginning time 224, ending date 226, ending time 228, or a spread pattern 230. Likewise, run-frequency data 232 may be provided.

A distribution icon title 202 may be an included distribution parameter 158. The distribution icon title 202 may be a descriptive identifier to be associated with an icon representing a distribution, or a distribution object 80. Moreover, the distribution icon title 202 may be the name by which a distribution is known.

The distribution object 80 may contain a list 204 of contacts or contact list 204. Each contact record 206, or entry 206 may represent an individual person responsible for implementing a distribution associated with the distribution object 80.

Individuals identified in the contact list 204 may be appropriate to contact in the event of a failure or question with respect to a distribution. Thus, the contact list 204 may identify some human contact data 206 for the user associated with the workstation 58, source node 56, or directory services node 60.

A path 208 may be provided for identifying an application 108 to be executed as part of a distribution process. The application path 208 serves as a pointer to an executable 108 that may be used by the distribution executable 92 hosted by the workstation 58. The application 108 may be thought of as a called routine 108 in a library 107 of routines 108, 109. A routine 108 or application 108 provides services associated with the distribution process. The application 108 may be embedded in the distribution executable 92. However, it may be advantageous to separate certain generic processes 108, 109 to be executed by any distribution executable 92 in any workstation 58.

Scripts 210 may be provided. A first script 211a may be executed prior to a distribution. The second script 211b may be a post-processing script 211b for use by the workstation. The pre-processing script 211a may be used as a set up routine 211a, for example, by the workstation 58 prior to a distribution. The post-processing or second script may be executed by the workstation 58 as a clean-up to restore configurations as necessary.

A platform identifier 212 may be included in the distribution object 80. A platform identifier 212 may target or identify those platform types for which a distribution is intended. For example, certain software may only be appropriate for certain platform configurations, models, and the like. Thus, the platform types for which a distribution is intended may be identified in the distribution object 80.

In one embodiment, a distribution object 80 may actually be instantiated multiple times. For example, in order to balance the use of resources involved in a distribution, certain instantiations of a distribution object 80 may be associated with different servers 54, source nodes 56, and the like. Thus, when a workstation node 58 accesses a distribution object 80, a selection algorithm may provide one of several instantiations 80, 81, 83 of the distribution object 80. In this way, the resources available for a distribution may be partitioned among several instantiations 80, 81, 83 of the distribution object 80 to balance the distribution task load.

Different instantiations 80, 81, 83 of the distribution object 80 are not required to be identical to one another. That approach is available in one alternative embodiment. However, in order to balance the distribution task load, instantiations 80, 81, 83 of a distribution object 80 may be similar or identical, in almost every respect, except for one or more distribution parameters 158. For example, the choice of server 54 or the choice of source node 56, or the choice of some path 208 may vary between instantiations 80, 81, 83.

In an apparatus and method in accordance with the invention, the multiple instantiations may be identical. Alternatively, they may differ in any respect in order to serve the need of balancing the distribution task load.

Fault tolerance options 214 may be built into a hierarchy of distribution objects. Fault options 214 such as primary 214a, secondary 214b, and tertiary 214c options may identify alternative distribution objects 80, 81, 83 to be used in the event of a failure.

For example, a primary set of options 214a for a distribution may select one distribution object 80. In the event of a failure of the distribution in accordance with the first (primary) choice 214a of distribution object 80, an alternative or second choice 214b corresponding to or identifying another distribution object 81 may be accessed.

Similarly, a failure, for any reason, of a distribution, in accordance with the distribution object 81, or distribution-controlling data 150 contained in the distribution object 81 second choice 214b may result in a default to a third choice 214c. The third choice 214c may correspond to a distribution object 83, and so on.

Thus, the distribution will proceed, even though not as rapidly, not in a desired path, not in a desired time, or not according to a desired schedule, or not according to some other failed, although preferred, method or hardware. Thus, any parameter that may be subject to a failure, may be bypassed for an alternative parameter value in another distribution object 81, 83 of lesser preference in a fault tolerance hierarchy 214.

An association list 216, or target list 216, may contain identifiers associated with all of the logical entities 82 in a directory services data store 78 corresponding to actual entities that are targeted to receive a distribution associated with a distribution object 80. Different target identifiers 217 may be provided in the target list 216

A target identifier 217 may be a name, a characteristic, a quality or condition, or any other characterization by which appropriate targets may be distinguished from non-targets. Thus, a distribution may be controlled on the basis of need-to-know, access rights, or any other identifiable parameter that may be included as a target identifier 217 or target characteristic 217.

Local configuration data 218 may be included in a distribution object 80. Local configuration data 218 may identify to a workstation node 58 conducting a distribution, certain local configurations of the workstation node 58 that should be implemented as part of the distribution. The configuration data 218 may be embodied as configuration objects 218 within the distribution object 80. Thus, at different times associated with a distribution, i5 different configurations may be implemented according to the configuration objects 218.

Tokens 220 may be provided in a distribution object for tokenizing virtually any distribution parameter. In one embodiment, tokens 220 may be implemented as macros. Any string, variable, or other parameter may be identified as a macro (token, etc.) which will point to other data, strings, parameters, executables, or the like to define the parameter that is represented by the token 220.

Accordingly, when a particular distribution-controlling parameter is to be accessed, a token may instead be accessed to redirect the flow of the distribution. Thus, in place of a constant distribution parameter, the token 220 may point to another string of data, another executable, another parameter, or another macro to be executed to provide the actual value of the parameter in question during that distribution.

Scheduling data 88 (see FIG. 2) may include several parameters of significance to a distribution. For example, certain distributions may be executed in parallel as a matter of revision control, security universality, or the like.

Further to the example, distributions may be implemented well in advance by creating a distribution object 80. The scheduling data 88 in the distribution object 80 may cause a distribution to occur at or near a particular date and time when a new revision of a software object is to become available. Thus, every distribution target 142 (see FIG. 5) may receive the software object 100 of a distribution at the same time. Such simultaneity may preclude operation with obsolete software by particular nodes 11, 52, 58, 64 within a network 30.

In another scenario, a virus eradication software object may be implemented. In order to assure universality of eradication, all distributions may be scheduled to occur simultaneously. This simultaneity may preclude the virus surviving, since the virus cannot take advantage of time lags between implementation of the virus eradication object in various targets 142. The virus cannot "hide" in one part of a network 30 while eradication occurs in another part of the network 30, to migrate again later.

Scheduling data may include an effective beginning date 222 and beginning time 224 at which a distribution may begin. This may be thought of as an authorization time or date. Other parameters may provide an imperative requirement that a distribution must begin by a certain date and time.

An ending date 226 and ending time 228 may provide an end to an authorization. That is, no distribution may occur after the end date 226 and end time 228.

A spread time 230 may be provided. A spread time 230 may be used to establish a window over which time a distribution will occur. For example, it is undesirable to completely dominate a network or several nodes 52 in a network 30 at one time.

On the other hand, a certain simultaneity may be desirable. Thus, the spread time 230 may provide a size for a time window during which the distribution should occur. The time window established by the spread time 230 may begin at some time (e.g. anytime) between the begin date 222 and time 224 and the end date 226 and time 228.

The spread time 230 is an optional parameter. It need not be required. However, it may allow a distribution to meet certain criteria for simultaneity without disrupting other work.

A run frequency 232 may be established by a "run once" selection 234, a "run-at-interval" selection 236 or the like. The run frequency 232 may control a distribution to a single execution. Alternatively, the distribution may be periodically repeated.

For example, a database may require updating periodically. Thus, an updating distribution of a software object 80 may occur daily, hourly, or the like. Similarly, a software distribution may occur on a single occasion. In setting up a distribution object 80, the frequency 232 of distribution or frequency 232 of execution may be endowed with any suitable periodicity.

Figure 8:
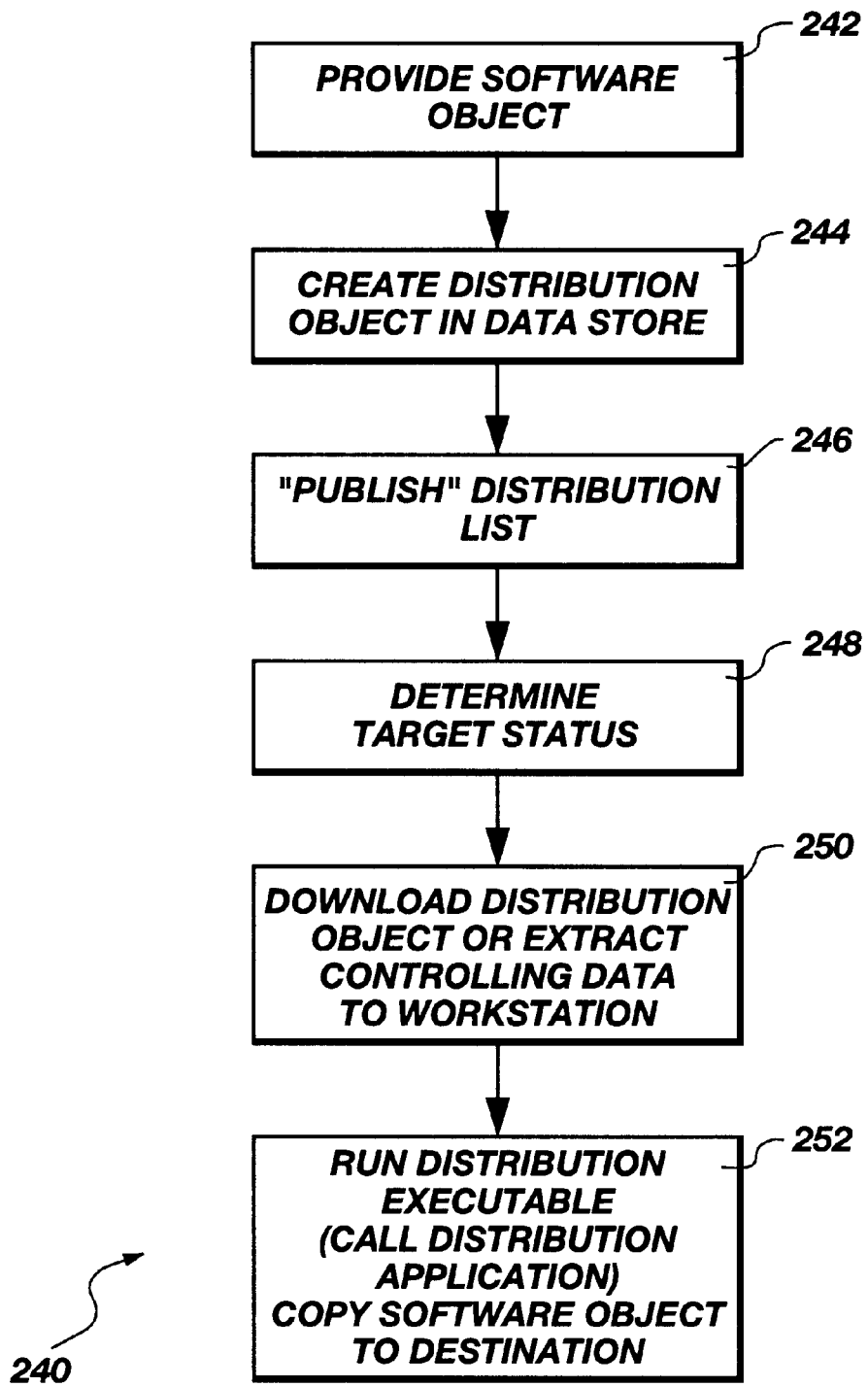
FIG. 8 is a schematic block diagram illustrating steps of a method consistent with the invention for distributing a software object in accordance with a distribution object contained within a data store of a directory services node of FIG. 2.

Referring to FIG. 8, a distribution process 240 may include a provision 242 of a software object 100. The step 242 of providing a software object may include providing the apparatus 10, or any desired or necessary part thereof for hosting a software object 100, and a distribution object 80.

A create step 244 may include providing a distribution object 80 containing all necessary distribution parameters 158 and any other distribution-controlling data 150. The create step 244 includes locating the distribution object 80 in a data store 78.

The create step 244 may include the publish step 246. In one currently preferred embodiment, a distribution object 80 may simply be available such that a target list 216 may be read by workstations 58 and other nodes 52 that are targeted for distribution of a particular software object 100. In an alternative embodiment, the publish step 246 may be a separately identifiable publication of a distribution list such as the target list 216.

In yet another alternative embodiment, an actual distribution list may be provided for binding some number of target identifiers 217 to an identification of certain software objects 100 to be distributed according to some distribution object 80 also bound thereto. The implementation scheme for the steps 244, 246 is not so critical as the objectives to be accomplished.

The distribution object 80 associated with a software object 100 to be distributed, needs to be provided. Thereafter, some mechanism to publish the information associating the software object 100 and distribution object 80 corresponding thereto with a target identifier 217 is needed.

Similarly, the determination step 248 for determining whether or not a particular node 52 is represented in a target list 216 for a distribution, may be done automatically as a part of a publication 246. Alternatively, a particular node 52, such as a workstation 58 may actually make a separate determination 248 that it, or some other node 52, 62, for which it 58 is responsible, has been targeted for a distribution.

The download 250 by the responsible workstation 58 may copy all or part of a distribution object 80 to the workstation node 58 needing the distribution-controlling data from the distribution object 80 in order to complete the distribution.

Properly informed by the download 250, a workstation 58 may then run 252 a distribution executable 92. A distribution executable 92 may include, embedded within it, or may call, a distribution application 108. As discussed, a distribution application 108 may be one of several applications 108, 109 stored in a distribution library 107. Although illustrated in FIG. 4, as stored in the source node, the distribution library 107 or the distribution application 108 may be stored in any suitable memory device 14.

The distribution executable 92 may include appropriate calls or coding to effect copying of the software object 100 designated by the distribution object 80 to some destination node 52. In one embodiment, a destination node 52 may actually be the workstation node 58 itself, distributing a software object 100 to itself. In an alternative embodiment, the destination node 52 may be another workstation 62 remote from the workstation node 58 conducting the actual distribution 252.

Referring to FIG. 6, attributes 146 of a directory services object 80 may be implemented in various embodiments. Methods 148 may or may not be included in a directory services object 80. For example, a distribution object 80 may include methods 148 for using various of the attributes 146.

Methods 148 may include distribution methods 252. Distribution methods 252 may include any of the executables required for effecting a distribution in accordance with the attributes 146 of a distribution object 80. Of course, methods 148, 252 may be embodied outside of the distribution object 80, depending on the extent to which the directory services system is to be burdened with the maintenance of distribution executables.

In one embodiment, distribution methods 252 may include maintenance methods 254. Maintenance methods 254 may be thought of as constituting a subset of the distribution methods 252. Alternatively, the maintenance methods 254 may be thought of as monitoring or verifying the integrity of files installed as a result of a distribution, in conjunction with re-execution of certain distribution methods 252 in the event of a fault, such as a configuration fault, or such as a missing or damaged file. In one presently preferred embodiment, maintenance methods 254 include monitoring and verifying processes or steps coupled with selected aspects (e.g. processes, steps, etc.) of the distribution methods 252, to be relied upon after a distribution has been completed.

Referring to FIG. 7, distribution parameters 158 may include specific attributes 256–262 adapted to support and maintain healing of software, or routine maintenance of software. In one embodiment, maintenance may encompass a healing procedure. Alternatively, one may think of healing software as a specific, explicit process, where as maintenance may include a continual program of monitoring. Thus, maintenance may be thought of as including scheduled review or verification of the integrity of files required for installed software. By contrast, healing may be thought of as a process of manual maintenance or user intervention in response to a desire to verify or a failure to launch selected software.

In one embodiment, self-healing flags 256 may be included in the distribution parameter 158. The self-healing flags 256 may be set up as inputs to control execution, reminders, inputs, and the like required to execute a verification or a healing of installed software files.

Self-healing data 258 may be included as distribution parameters 158. Whereas the flags 256 represent control of invocation and execution of verification and healing processes, the data 258 may be directed to supporting data that is not necessarily required to vary between users, or between various software files, but may generally support any executables responsible for verification or healing of files.

Maintenance flags 260 may be thought of as controlling parameters used to invoke maintenance procedures. Thus, flags 260 may be though of as control settings. Maintenance flags 260 may be controlled by a user, a system administrator, or the like, as appropriate.

As with self-healing data 258, maintenance data 262 may support execution of maintenance procedures. For example, ongoing maintenance executables may require fundamental data 262 that is not properly coded within them. Nevertheless, the maintenance data 262 may be operational data, rather than controlling data that should be readily accessible to a user, or even a system administrator, in certain situations.

As a practical matter, the flags 266, 260 and the operational data 258, 262 may include any or all of the additional distribution parameters 158 illustrated in FIG. 7. Thus, the data structures 256–262 developed for verification and healing, whether on an instance by instance basis or as part of an ongoing maintenance program, may be stored in a distribution object 80, as attributes 146.

Figure 9:
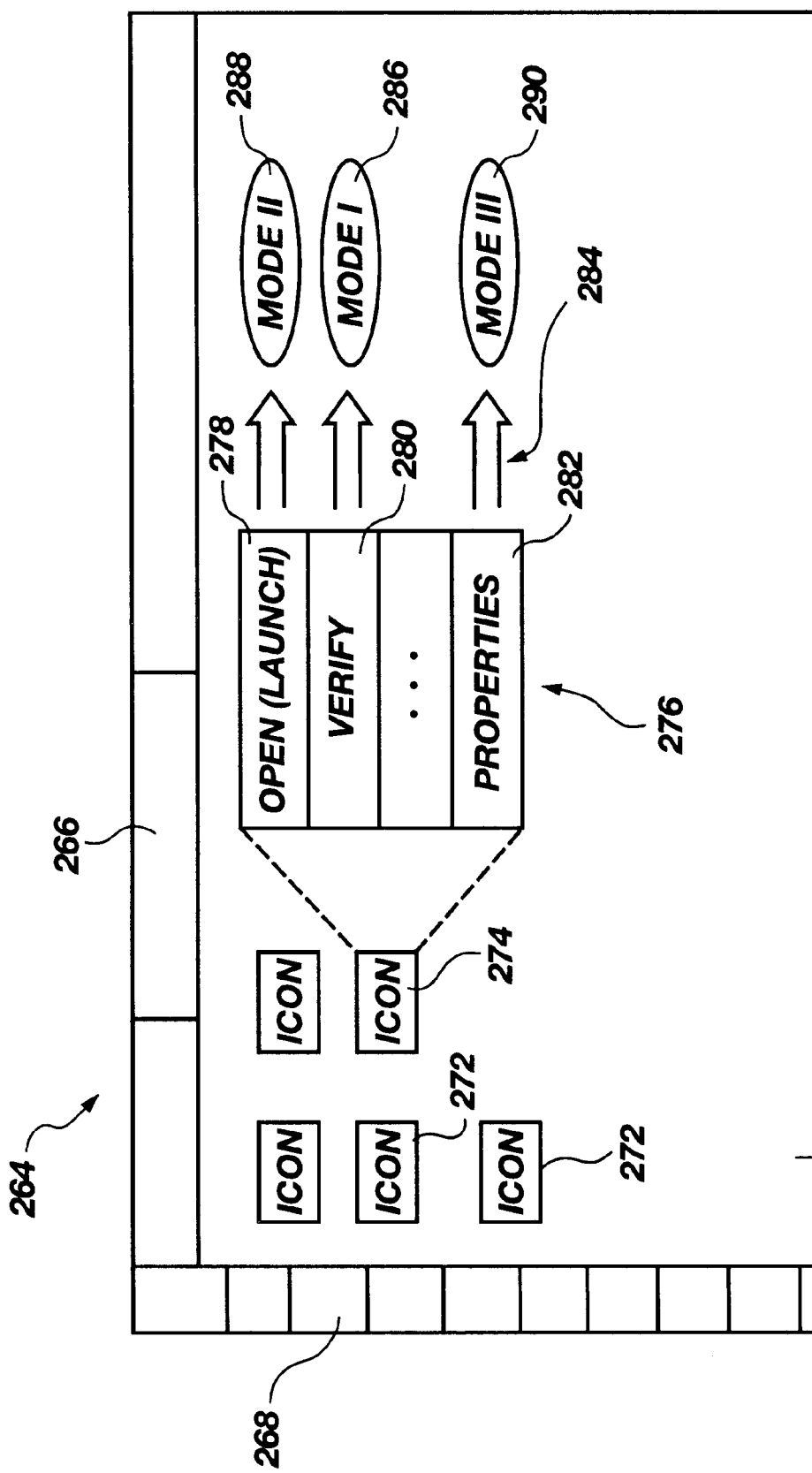
FIG. 9 is a schematic block diagram of a user interface screen illustrating access to multiple modes for embodying the invention.

Referring to FIG. 9, a user (e.g. individual user, system administrator, etc.) may be presented with a screen 264 on a monitor 42. The screen 264 may present menus 262 and tool palettes 268 as appropriate and as known in the art. A window 270 on the screen 264 may include several icons 272 associated with various software applications. In one embodiment of an apparatus and method in accordance with the invention, an icon 274 may be provided with additional options in the menu 266 or upon a selection of an icon 274. For example, selecting or opening an icon 274 may present a menu 276 containing various selections 278–282. Typically an OPEN command 278 may result in launching an application associated with an icon 274. Alternatively, an OPEN 278 command may be implemented by a specialized selection such as a double-click on an icon 274.

However, in certain embodiments of an apparatus and method in accordance with the invention, a VERIFY 280 selection or command may be provided. The VERIFY command 280 may be used to invoke special procedures to assure evaluation and repair of files required by an application associated with the icon 274.

Certain properties 282 may be associated with an application 274, speaking of the icon 274 as if it were the application itself. Properties may include any desired settings associated with the icon 274 or application 274. For example, attributes such as distribution parameters 150 may be properties. Healing may be controlled by setting selected properties 274. As a practical matter, the properties 282 may be selectable by a user. Alternatively, certain of the properties 282 may be displayed to a user but only available to a system administrator to configure. In yet another alternative embodiment, certain of the properties 282 may be set up by a system administrator and unavailable to a user for viewing or modification.

In certain presently preferred embodiments of an apparatus and method in accordance with the invention, invocation 284 of any of the commands 278, 280 or implementing certain properties 282 may result in different modes 286, 288, 290 of operation of healing and verification processes. In one embodiment the VERIFY command 280 invokes mode-I 286. Mode-I 286 may be thought of as an explicit opportunity to verify, and if appropriate heal damaged or missing files from an installation.

Mode-II 288 may be thought of as an automated verification associated with an attempt to open 278 or launch 278 an application 274. Accordingly, Mode-II 288 may involve automatic verification and healing, or automatic verification with a prompt allowing selective healing or abandonment of an application 274. Mode-III 290 may be thought of as an ongoing, typically periodic, process of verification of the integrity of files. Again, mode-III 290, in one embodiment, may be completely automated, and transparent to a user.

Figure 10:
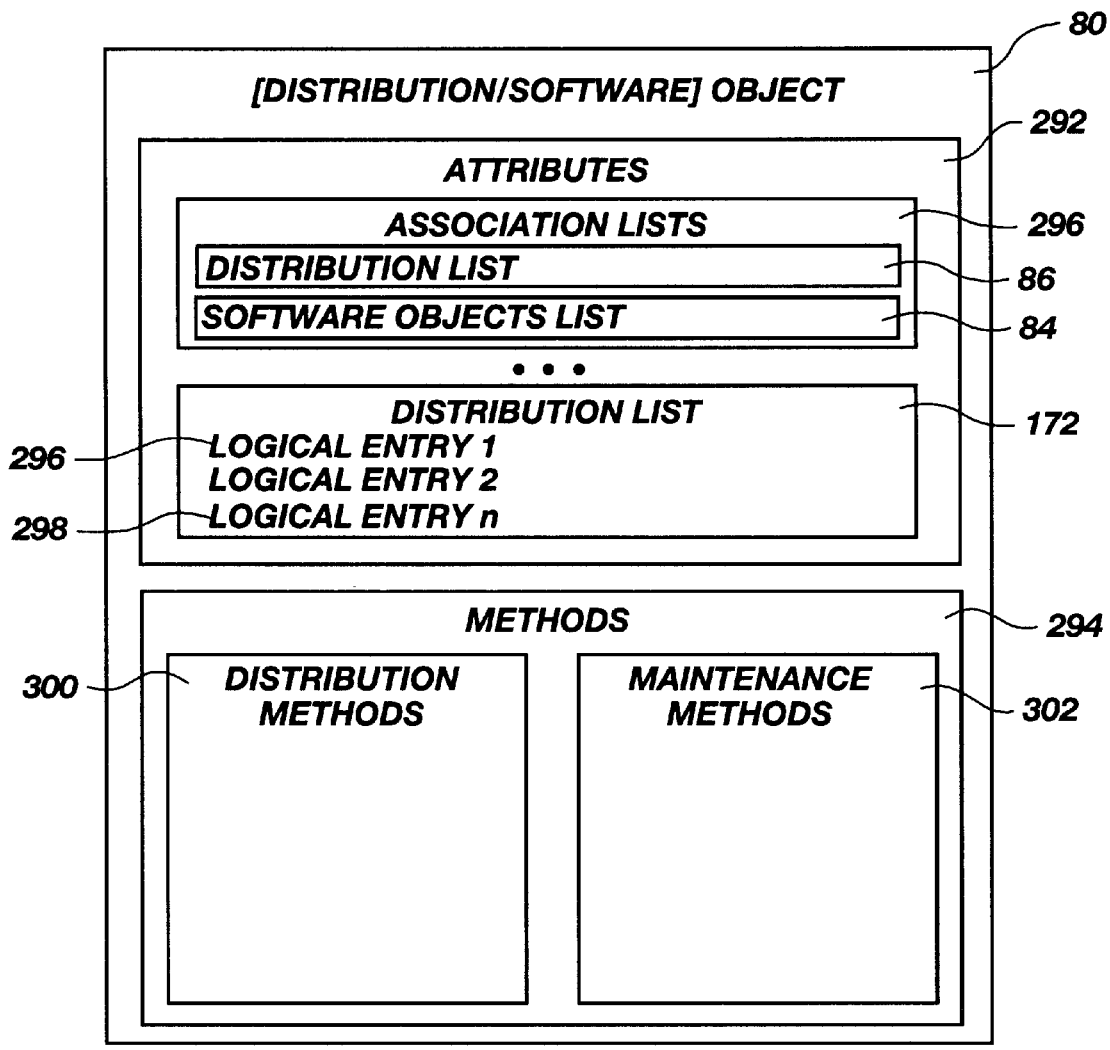
FIG. 10 is a schematic block diagram of one embodiment for including methods and attributes, in accordance with the invention, in a directory services object.

Referring to FIG. 10, distribution objects 80 may be configured to have attributes 292 and methods 294 in accordance with a directory services schema The object 80 may be a distribution object 80 or a software object 98. That is, a software object may have the attributes 292 and 294 for accomplishing a distribution. However, in an effort to minimize the burdens placed on the directory services executables 74, a distribution object 80 may be dedicated to the procedures of distribution, and not be associated with a particular software application or the like. The attributes 292 may be configured in accordance with conventional network directory services systems.

For example, association lists 296 may contain distinguished names 86 corresponding to a distribution list 86 (see FIG. 2). Thus, the association lists 296 may include a software objects list 84 and a distribution list 86 or a distribution objects list 86. Otherwise, association lists 296 may include other associations as permitted by directory services objects 80, 98 etc.

As a practical matter, a distribution list 172 may simply be all or part of an association list 296. Thus, as described with respect to FIG. 6, attributes 146, 292 may be contained within an object 80 in a format suitable for a directory services schema pertaining thereto. The distinguished names 296, 298 associated with specific logical entities 178 may be associated with a specific distribution, with a specific object 98, or the like. In general, however, the directory services object 80, may be configured as any other directory services object.

The attributes 292, in order to implement the invention, need to have the distribution parameters 158 for controlling distribution, along with the identification of sources and destinations as identified by distinguished names of directory services objects 80, 82, 98, etc.

Distribution objects 80 need not contain methods 294. All executables required for conducting a distribution may be written in code stored on a node 11 within a network 30, 50. Nevertheless, in one embodiment, methods 294 for implementing distribution, verification, and repair of software files may be embodied in methods 294 within the object 80. As discussed with respect to FIG. 6, distribution methods 300 need not be exclusive of maintenance methods 302. Maintenance methods 302 may involve verification in testing procedures for periodically or otherwise evaluating the integrity of installed software files. By contrast, distribution methods 300 may be thought of as the distribution procedure. Accordingly, proper maintenance methods 302 may rely on verification and detection schemes but invoke original distribution methods 300 to re-distribute software that has been corrupted, removed, or the like.

Figure 11:
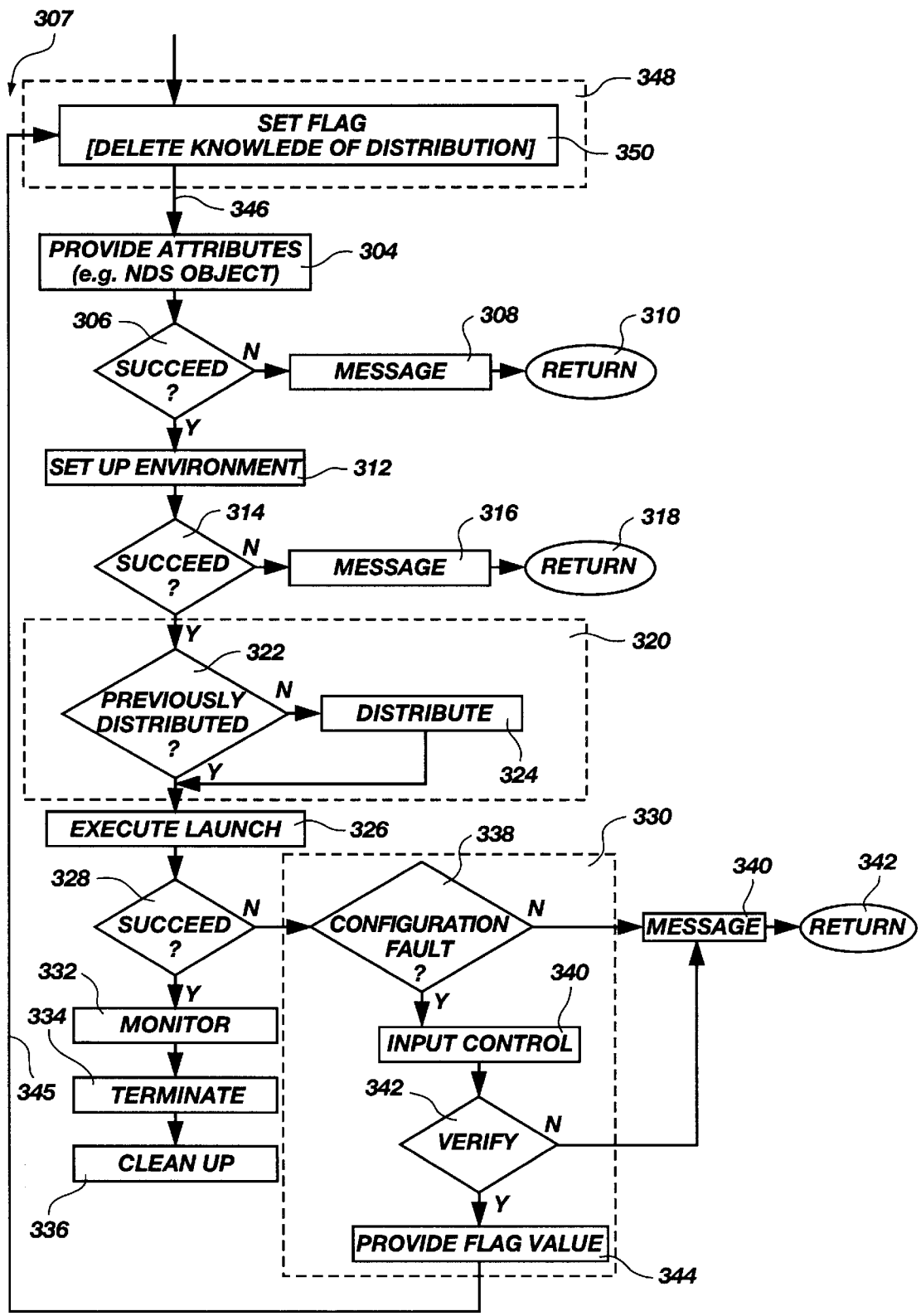
FIG. 11 is a schematic block diagram of one embodiment of certain methods for implementing detection and healing of faults in software files following a distribution.

Referring to FIG. 11, a method 303 illustrates one embodiment of a maintenance method 302. The method 303 presumes that the apparatus and methods of FIGS. 1–9 may be available as distribution methods 300. Likewise, any particular portions of the methods and apparatus of FIGS. 1–8 may be reused out of the distribution methods 300 in order to implement the maintenance methods 302.

Referring to FIG. 11, the method 303 may include an attribute step 304 or provide attributes step 304. The provide step 304 may include both providing and subsequently reading or relying on attributes 292 of a distribution object 80 or a specific software object 98 controlled by a distribution object 80. The provide step 304 may thus review any of the distribution parameters 158 associated with either a source or destination of a distribution, and associated with either a distribution object 80 or attributes of a software object 98, itself.

A test 306 may determine whether or not a provide step 304 found the required data. If the desired data is not available, a message 308 followed by a return 310 may be appropriate.

If the test 306 results in the provide step 304 having been completed properly a setup step 312 or environment step 312 may be responsible for setting up the environments required for launching an application. A test 314 may determine whether the setup 312 was successful. If not, a message 316 and return 318 may be appropriate. However, if the setup 312 is successful, then a healing module 320 may be invoked. The healing module 320 may be comparatively simple or sophisticated. Thus, the healing module 320 may be thought of as a verification module 320, in certain embodiments.

For example, module 320 may first test 322 to determine 322 whether an application has been previously distributed. If not, then a distribute step 324 may distribute the selected application 274. The distribute step 324 or the distribution 324 may rely on any or all of the apparatus and methods of FIGS. 1–10. If the test 322 identifies that a software distribution was previously completed, the method 303 may advance to the execute step 326 or launch step 326. Thus, the launcher is executed 326 to run an application 274 associated with an icon 274.

Launches 326 are not always successful. A test 328 may determine whether the launch 326 succeeded. If the launch 326 was successful, then a monitor step 332 may continue to monitor the application 274 until termination 334 is appropriate. Thereafter, a cleanup step 336 may clean the open files up.

However, if a launch 326 is unsuccessful, conventional systems may merely report back with a message 340 and a return 342 of control of the processor. However, a recovery 330 may provide a test 338 to determine the nature of the failure of the launch 326. If the test 338 identifies a failure mode that is not adaptable to cure by the method 303, the message 340 and return 342 may follow. Nevertheless, if the test 338 identifies a configuration fault, input 340 or an input control step 340 may be appropriate. The input step 340 may either read from selected data in an object 80, 98 or in a file, selected information.

Alternatively, the input step 340 may provide for inputs by a user to determine whether or not to verify the configuration of the desired application 274. For example, a test 342 may determine whether a user, or program desires to verify the configuration of files. An important feature of the test 342 is that an installation or distribution is not always a brief process. Accordingly, a user or even a controlling software module may make a determination that verification will take more time than other available options.

Thus, the test 342 allows a decision as to whether or not to verify software integrity. If the test 342 results in a request to verify, a provide flag value step 344 or flag value step 344 may provide a triggering value for a controlled parameter programmed to initiate verification. In one embodiment of an apparatus and method in accordance with the invention, the recovery process 330 is followed by a return 345 to a point in the procedure 303 prior to the incoming path 346.

Although the flag value step 344 may complete the features of the set flag step 350, the set flag step 350 may be embedded in other previous procedures 348. Thus, the flag value step 344 may simply return a value suitable to cause the set flag step 350 to operate properly. In one presently preferred embodiment, the set flag step 350 may cause or complete deletion of knowledge of a distribution. Thus, the set flag step 350 may be simple or sophisticated. The previous processes 348 that may occur prior to the provide step 304 may include processes 348 that precede any distribution.

The provide flag value step 344 may thought of as setting a trigger and then returning execution to some previous process 348 or step 348. In one embodiment, the return 345 may return to the set up step 312 or the test 314. However, in one presently preferred embodiment, the current values of attributes to be provided 304 are relied upon with each return 345.

Figure 12:
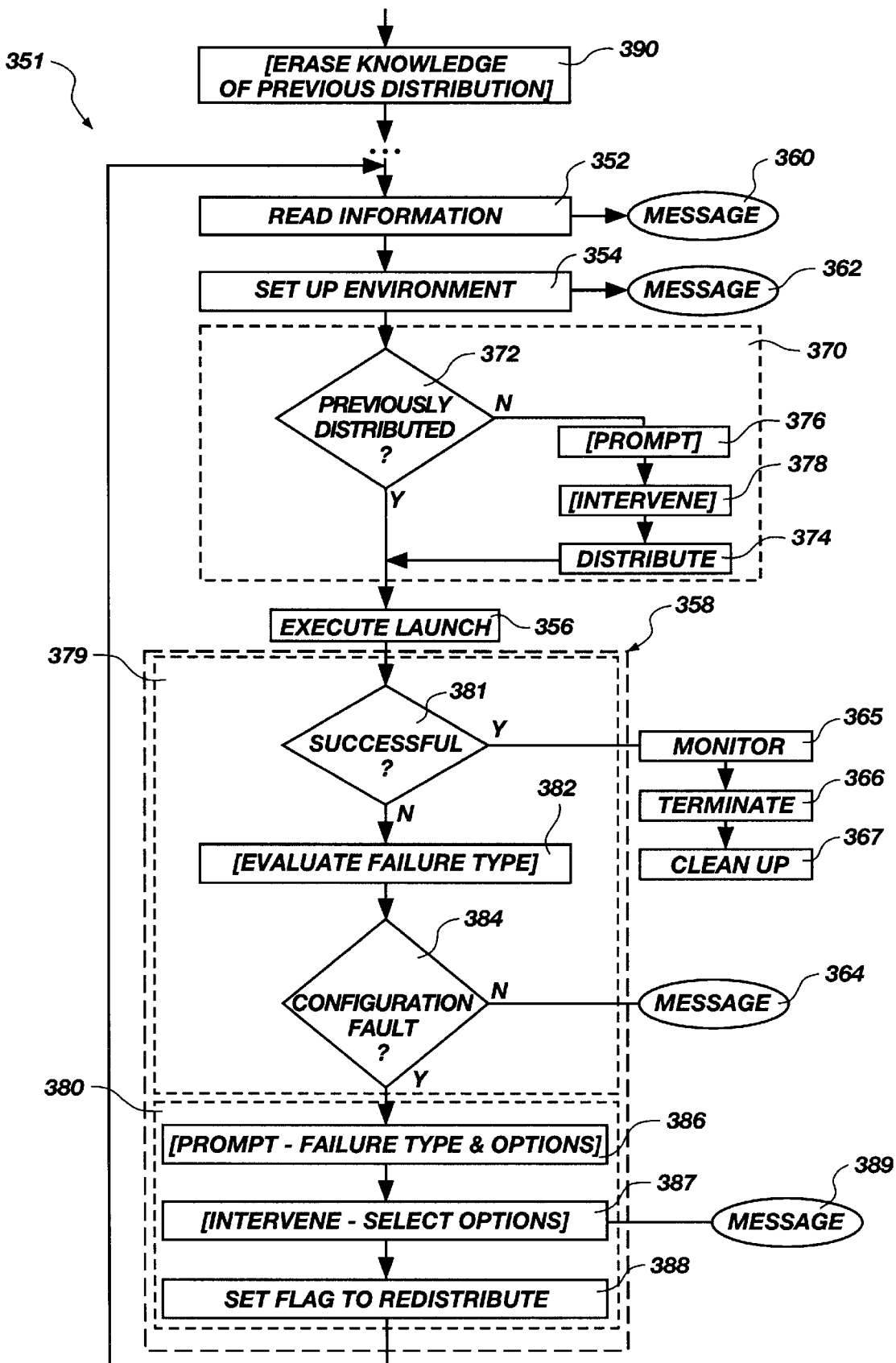
FIG. 12 is a schematic block diagram of an alternative embodiment of methods for verification and healing of distributed software files.

Referring to FIG. 12, an alternative embodiment of a method 351 is illustrated. In FIG. 12, a read step 352 may provide any distribution information desired. In one embodiment, the read step 352 may provide for reading of attributes 292 from a distribution object 80 or software object 80, 98 or the like. A setup 354 may setup an environment in accordance with distribution information or other attributes 292 associated with a software object distributed or with a distribution object for controlling a distribution. Following the setup 354 a launch 356 may be executed.

Following execution of a launch 356, whether successful or not, a transparent verify process 358 may be executed. As a practical matter, failure of any of the steps 352, 254, 356 may result in appropriate message 360, 362, 364, respectively, in FIG. 12 the messages 360, 364 imply some subsequent return or a return of control out of the purview of the method 351. Thus, the messages 360–364, may normally correspond to messages normally received in response to failures of launches 356 or previous steps 352,354, previous thereto. The verify process 358 may be thought of as an embodiment of mode-II 288 comparing FIGS. 11 and 12, one may see that the set flag step 350 which may optionally delete knowledge of a distribution, in combination with the healing step 324 distributing 324, in accordance with the set flag step 350, may embody a mode I 286 process.

Similarly, the recovery 330 of FIG. 11 may be thought of as one embodiment of a mode II 288 process. That is, a conscious setting 350 of a flag value 344 corresponds to a verify selection 280 in the menu 276. This is mode I 286. However, a recovery 330, when returning processing to the set flags step 350, and relying on the healing 320 or distribution 320 process, may constitute mode-II 288. Mode-II 288 results automatically from an attempt to use the OPEN command 278 unsuccessfully.

Thus, in FIG. 12, somewhat different but corresponding portions of the process 351 may provide for more or less intervention and awareness by a user. Thus, referring to FIG. 12 the success of a launch 356 may result in a monitor step 365, a terminate step 366, when appropriate, and a cleanup step 367 thereafter. The cleanup step 367 may involve a return of control of the computer within its procedures.

Referring again to FIG. 12, the healing step 370 may provide a test 372 triggered by the existence of any information indicating the previous execution of a distribution. If the test 372 indicates, for any reason, that a distribution was not done, a prompt 372 may be sent to a user. The prompt 376 shown in rectangular brackets indicates that the step 376 is not required. For example, a user may not want to be bothered. Alternatively, since a distribution 374 or a distribute step 374 may be very time-consuming a user may want to be prompted 376 in order to intervene 378. Intervention may or may not include scheduling, approving, denying, or delaying the distribution 374 and so forth. Alternatively, the prompt 376 may provide certain heuristic information to a user providing options with some indication as to suggested, recommended, or highly probable interventions 378.

A test process 379 may include multiple tests 381, 384. A response 380 may then follow the test process 379. In one embodiment, the test process 379 may include a test 381 to determine whether or not a launch 356 is successful. If successful, the launch 356 need only advance to the monitor step 365. However, if the launch 356 fails, an evaluate step 382 may be interposes. The evaluate failure type step 382 may be optional. However, the evaluate step 382 can be very useful. For example, if mechanisms are available to determine the nature of a failure of the launch 356, certain failure modes may be easily remedied.

In one embodiment of an apparatus and method in accordance with the invention, a test 384 may determine whether a failure type identified by the evaluation 382 was caused by a configuration fault. Specifically, a configuration fault may result from files not being found when required. If the failure is not of a type that can be remedied by the response 380 and healing procedure 370, the message 364 that would have occurred upon failure of the launch 356 may still be provided. However, if the test 384 reveals a configuration fault, the to response 380 may provide for transparent or visible execution of options for a user.

The response 380 may provide a prompt 386 identifying a failure type and options available to a user. The prompt 386 may be provided to a user as a displayed message on a monitor 42 or other output device 24. Alternatively, the prompt 386 may be provided to software that has requested the launch 356.

An intervene step 387 or intervention 387 may provide for selection of options among those suggested by the prompt 386. Since a user may always opt out of waiting for a distribution 374, one result of the intervention step 387 may be a message 389 indicating the status of the failure of the launch 356.

Alternatively, the set flag step 388 may be provided with a value for triggering a distribution 374. As with the method of FIG. 11, the set flag step 388 may be reduced to a single step within the response 380. Alternatively, the set flag step 388 may be subdivided to providing a value as with the flag value step 344 of FIG. 11, with the actual setting of the flag being executed by a process 390, prior to the read step 352. That is, the response 380 may return to the read step 352, or to the erase step 390. In general, the erase step 390 may simply be any previous step 390 from which the read step 352 is reached.

Optionally, some step 390, occurring previous to the read step 352 may erase knowledge of a previous distribution. Whether integrated or separated, the set flag step 388 will typically set a value that can be assigned to a flag for controlling the recognition by the test 372 of a distribution. Thus, a lack of recognition of a distribution by the test 372 is all that is required.

Likewise, the distribution 374 may, and should, review or verify the existence of files that may be affected by the distribution 374. That is, the distribution 374 need not and should not install files that do not need to be reinstalled. Many times, files are shared by multiple applications. Accordingly, distribution object 80, rather than a particular application 274 may and usually should control the configuration of shared files.

The inclusion of the healing step 370 may effectively implement the verify selection 280 or mode I-286. Of course, the erase step 390 can be over ridden or obviated by the intervention step 378. That is, the process 370 explicitly can provide for intervention 378 resetting any knowledge of a previous distribution without resort to the previous step 390. Thus, the response 380 need not return to the step 390.

Thus, the intervene step 378, in association with the prompt 376 and subsequent distribution 374 may verify a software integrity. In one embodiment, the prompt 376 may actually provide the analysis of filing integrity. Thus, a user may intervene 378 knowledgeably, based on a rather sophisticated prompt 376. In one embodiment the prompt 376 may merely be the entry 280 in the menu 276. Thus, simple or sophisticated, the healing step 370 may provide a mode-I 286 procedure. Accordingly, the recovery 358 may operate in the absence of the process 370. For example, failure of the launch 356 is all that is required for invocation of the evaluation 386, test 384, and response 380. Thus, one embodiment of mode-II 288 in response to the failure of a launch 278 request from the menu 276 may heal desired software 274.

Figure 13:
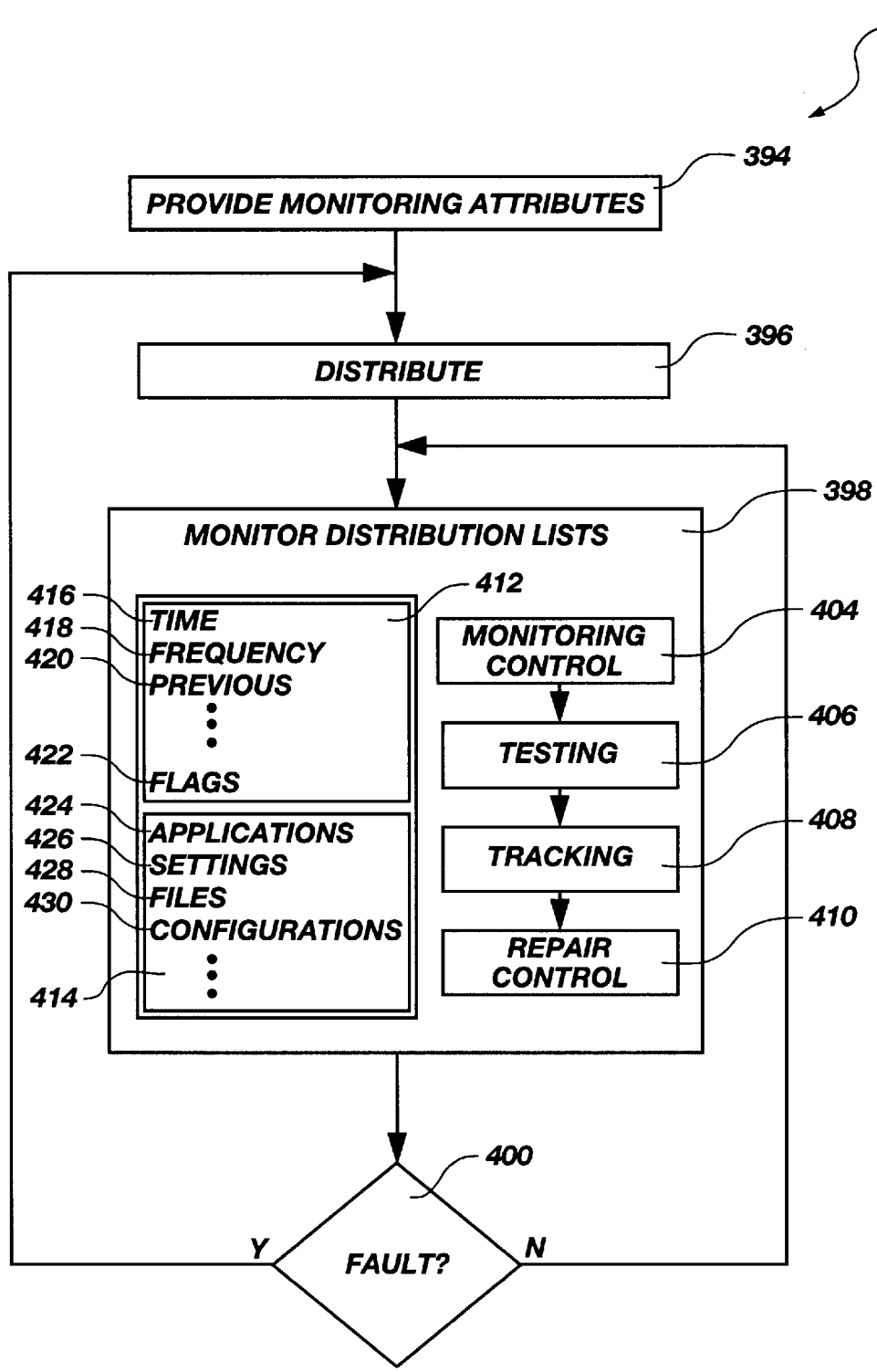
FIG. 13 is a schematic block diagram of an alternative embodiment of a method for ongoing monitoring and repair of distributed software.

Referring to FIG. 13, a currently preferred embodiment of a mode-III 290 is illustrated. The method 392 may provide 394 attributes corresponding to monitoring. That is discussed with respect to FIGS. 6–7, maintenance flags 260 and maintenance data 262 may be provided 394 by the provide monitoring attributes step 394. A distribution 396 may complete the distribution of software as described with respect to FIGS. 1–8, or even FIGS. 1–12. However, a monitor process 398 or monitor step 398 may include several features for exploiting distribution object's 80 attributes 292 and methods 294, if available.

In general, a provide attribute step 394 may be done as a distribution. Thereafter, a sophisticated distribution process 396 may perform the maintenance. That is, the provide monitoring attributes step 394 may be included with the attributes 146, such as distribution parameters 158. Thereby, any distribution 396 will be done in accordance with monitoring attributes 260–262.

Thereafter, a monitoring process 398 may continue to monitor software integrity in accordance with the distribution 396. A test 400 may periodically, or at selected times, or in response to specific requests evaluate whether or not a fault exists in the integrity of a software configuration. If no fault exists, the test 400 may return to the monitoring process 398 as illustrated. If a fault does exist, the distribution 396 may be repeated. The distribution 396 need not be total. Evaluation of file names and conditions may provide for replacing or repairing a single file.

A monitoring control step 404 may set up controls based on maintenance flags 260 for scheduling and executing verification of software integrity. A testing step 406 may actually execute testing and evaluation in accordance with the controls, such as the maintenance flags 260. Likewise, the testing step 406 may rely on certain maintenance data 262 for determining what to test and how to operate.

The tracking process 408 or tracking step 408 may save selected data to a log. For example, failures, re-distributions, status information associated with times, locations, and the like may be tracked 408. Any information useful for establishing patterns, targeting frequent failures, and the like may be included in the tracking step 408.

A repair step 410 or repair control step 410 may provide controls for the repair processes of the methods 303, 351, 392. Alternatively, the entire monitor process 398 may merely execute in accordance with attributes 292 of a software distribution object 80. For example, the monitoring control step 404 and repair control step 410 may simply involve executables, each executing in accordance with data provided in or controlled by selected attributes 292. Attributes of software objects associates with applications 274 distributed may also be used as data by the monitoring control step 404 and repair control step 410, as well as the testing 406 and tracking 408.

In one embodiment, monitoring control data 412 and application data 414 may be used in the process 392. For example, a specific time 416 may be provided for verifying software integrity or a distribution. Alternatively, or in combination with the time 416, a frequency 418 may be used. Thus, specific times 416 or regular periodicity 418 may be relied upon for monitoring 404. Similarly, data associated with a previous condition 420 may exist. For example, a previous distribution 420 may be recorded as to time, location, or the like. Likewise, any of the flags 422 may be selected from the self healing flags 256, the maintenance flags 260, or the like. Thus, in general, the monitoring control data 412 may be used directly from directory services object attributes 292 or may be temporarily stored elsewhere or may be stored elsewhere entirely. However, In one presently preferred embodiment, the monitoring control data 412 exists within a distribution object 80 as attributes 292. Thus, the flags 256, 260 and the data 258, 262 within the distribution parameters 158 of the attributes 146 in FIGS. 6–7 may be relied upon for the monitoring control data 412 and the application data 414.

One may note that the distribution parameters 148 may be multiple and duplicated For example, the data structures 256–262 may include any or all of the remainder of the attributes 202–236. Accordingly, the monitoring control data 412 illustrated in FIG. 13 is by way of example. Similarly, the application data 414 is by way of data. For example, application identification 424, settings 426, file identifications 428 and other configuration data 430 may be included for use in the monitor process 398. Nevertheless, the distribution parameters 158 may be relied upon, and may be expanded upon within the distribution object 180, in order to suitably coordinate both distribution and maintenance (e.g. verification and healing of software associated with a distribution).

The monitor step 398 may be followed by a step 400. The test 400 determines wether a fault exists in a software distribution or the file structures associated with software associated with a distribution. If no fault exists, then the test 400 may return to the monitor step 398. However, if a fault is detected, then a distribute step 396 may be invoked. Note that the distribute step 396, as illustrated, does not include opportunities for feedback and intervention. In one embodiment, the distribute step 396 may merely invoke the procedures, methods, and apparatus of FIGS. 1–8.

However, in other embodiments, the distribute step 396 may involve the apparatus and methods of FIGS. 1–12. However, in a mode-III 290, substantial benefit may be obtained by transparency. The monitor step 398 may operate in the background, without providing any awareness to a user. Similarly, the distribute step 396 need not be a complete distribution, rather, application data 414 that has been violated, by any entity, for any reason, may be discovered in accordance with the monitoring data 412. Accordingly, only those files affected may be selected by the repair control 410 for invocation of the distribute step 396.

In one embodiment, the entire method 392 may involve a providing attributes step 394 as part of the original distribution methods 252. Again, the distribution methods 252 need not be included in the distribution object 80, but may coded elsewhere. Nevertheless, a very simple monitoring process 398 with incremental distributions 396 may maintain software integrity without slowing down individual nodes II, 52, substantially, and without increasing traffic over the network 30,50.

From the above discussion, it will be appreciated that the present invention provides distribution of a software object 100 in accordance with the information available in a directory services node 60. The distribution process is itself distributed in nature. Thereafter, monitoring of the integrity of files may be conducted automatically or manually, visibly or transparently, as selected by a user or system administrator. Repair of files required for installed software may be completed by explicit request or automatically in accordance with ongoing monitoring and repair methods. Methods for implementing the invention may be programmed into any file system, including inclusion as methods in objects, such as directory services objects.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for implementing integrity verifying and correcting software, the apparatus comprising:

a memory device for storing data structures comprising operational data and executables;

a processor operably connected to the memory device for executing the executables;

a network operably connected to the processor for connecting a node to another node;

the node, hosting a directory services executable for maintaining a data store of directory services objects linked together, the directory services executable being programmed to maintain and search for the directory services objects in the data store;

the other node hosting a directory services client for using the directory services system by accessing the directory services objects;

the memory device, wherein the operational data further comprises a distribution object, an instance of a directory services object reflecting a configuration of files corresponding to software represented by a software object, corresponding thereto, distinct therefrom, stored in the directory services system, and containing controlling data, the controlling data controlling the processor in selectively verifying the presence and absence of links to files, finding absent links through the directory services system, and correcting the configuration proximate a run time remote from the installation time of the software.

2. The apparatus of claim 1, wherein the node and the other node are configured to operate using the processor.

3. The apparatus of claim 1, wherein the directory services executable is a directory services server.

4. The apparatus of claim 1, wherein:

the processor is contained within the node;

the memory device is operably associated with the node for storing the directory services objects; and the other node is further comprised of another processor programmed for executing a directory services client for receiving from the node selected data reflecting attributes from the directory services objects.

5. The apparatus of claim 1, wherein the memory device is operably associated with the node, and wherein the data structures include the directory services executable for execution by the processor.

6. The apparatus of claim 5, wherein the data structures comprise operational data for use by the executable during execution thereof.

7. The apparatus of claim 6, wherein the operational data comprises an attribute of an object.

8. The apparatus of claim 7, wherein the object is a directory services object in a directory services system.

9. The apparatus of claim 8, wherein the executable is a method in the directory services object.

10. The apparatus of claim 9, wherein the directory services object is selected from a software object, a distribution object, and a software maintenance object.

11. The apparatus of claim 10, wherein the attribute reflects distribution data for controlling distribution of files corresponding to a software object in the directory services system.

12. The apparatus of claim 10, wherein the executable is configured to be effective to monitor and maintain the files in accordance with the distribution data after an initial distribution thereof.

13. A computer readable medium containing executable and operational data structures, the data structures comprising:

a data store containing a plurality of searchable, hierarchical, directory services objects interrelated to one another;

a software object, of the directory services objects, corresponding to software installed at an installation time;

a directory services executable effective to provide directory services relating to the plurality of directory services objects, the directory services executable being programmed to maintain and search for the directory services objects in the data store;

a distribution executable for controlling distribution of files corresponding to the software object; and a distribution object, an instance of a directory services object, containing verification data and controlling data for use by the distribution executable to control the selective verification of a distribution of the software in accordance with the software object over a network proximate a run time remote from the installation time of the software, and to find, through the directory services data store, links required to correctly configure the software.

14. The computer readable medium of claim 13, wherein:

the objects are directory services objects related to one another in a hierarchy;

the directory services executable is programmed for managing attributes of the directory services objects and relationships therebetween in the hierarchy.

15. The computer readable medium of claim 14, wherein the data structures further comprise a heading executable for keeping installation of files corresponding to the software, and for reinstalling selected files not found properly linked at a time corresponding to the verification and remote from a previous intended installation time.

16. A computer implementable method for integrity verifying and correcting software, the method comprising:

providing network interconnecting nodes including a source node storing a software object corresponding to software;

providing a directory services system operably connected to the network and programmed to maintain and search a data store containing a hierarchical tree of searchable, directory services objects;

providing a workstation node operably connected to the network and programmed to receive from the directory services system a distribution object containing distribution-controlling data for controlling the directory services system to verify the configuration of the software, to find errors in the configuration thereof, and to redistribute portions of the software in accordance therewith at a time remote from the installation time of the software.

17. The method of claim 16, further comprising programming the workstation node to distribute the software to the workstation node.

18. The method of claim 17, wherein the distribution-controlling data further comprises distribution parameters, stored in a directory services object, for controlling verification of the distribution.

19. The method of claim 18, wherein the distribution parameters include verification data as attributes of a distribution object.

20. The method of claim 19, wherein the distribution parameters include scheduling data for controlling scheduling of the verification of the distribution.

* * * * *

UNITED STATES PATENT AND TRADEMARK OFFICE
CERTIFICATE OF CORRECTION

PATENT NO   : 6,023,586
DATED       : February 8, 2000
INVENTOR(S) : Gaisford et al.

It is certified that error appears in the above-identified patent and that said Letters Patent are hereby corrected as shown below:

In claim 15, line 17, please change "heading" to --healing--.

In claim 15, line 18, please change "keeping" to --verifying--.

Signed and Sealed this

Thirtieth Day of January, 2001

Attest:

Q. TODD DICKINSON

Attesting Officer

Director of Patents and Trademarks